United States Patent
Donnelly et al.

(10) Patent No.: US 9,439,370 B2
(45) Date of Patent: Sep. 13, 2016

(54) WICKING PLANTER SYSTEM

(71) Applicants: Brian C. Donnelly, Naperville, IL (US); Michael R. Vogler, Oswego, IL (US)

(72) Inventors: Brian C. Donnelly, Naperville, IL (US); Michael R. Vogler, Oswego, IL (US)

(73) Assignee: Suncast Technologies, LLC, Palm Beach Gardens, FL (US)

(*) Notice: Subject to any disclaimer, the term of this patent is extended or adjusted under 35 U.S.C. 154(b) by 3 days.

(21) Appl. No.: 14/092,584

(22) Filed: Nov. 27, 2013

(65) Prior Publication Data

US 2015/0143748 A1 May 28, 2015

(51) Int. Cl.
*A01G 9/04* (2006.01)
*A01G 27/06* (2006.01)

(52) U.S. Cl.
CPC ..................... *A01G 27/06* (2013.01)

(58) Field of Classification Search
CPC .... A01G 27/00; A01G 27/005; A01G 27/04; A01G 27/06; A01G 9/02; A01G 9/024; A01G 9/04; A01G 9/042
See application file for complete search history.

(56) References Cited

U.S. PATENT DOCUMENTS

| | | | |
|---|---|---|---|
| 1,251,552 A | 1/1918 | Marks | |
| 2,081,337 A | 5/1937 | Lockyer | |
| 2,238,132 A | 4/1941 | Ritter | |
| 2,738,621 A | 3/1956 | Abbrecht | |
| 3,220,144 A | 11/1965 | Green | |
| 3,676,953 A | 7/1972 | Delogne | |
| 3,903,644 A | 9/1975 | Swift et al. | |
| 3,965,616 A * | 6/1976 | Ridgeway | A01G 9/04 206/423 |
| 4,001,967 A | 1/1977 | Swift et al. | |
| D250,401 S | 11/1978 | O'Shea et al. | |
| 4,170,089 A * | 10/1979 | Smrt | A01G 9/024 47/67 |
| 4,171,593 A | 10/1979 | Bigglestone | |
| 4,198,784 A | 4/1980 | Sukert | |
| 4,270,309 A | 6/1981 | Baumann | |
| 4,315,382 A * | 2/1982 | Kay | A01G 9/042 47/71 |
| 4,329,815 A | 5/1982 | Secrest | |
| 4,346,532 A | 8/1982 | Peterson | |
| 4,356,665 A | 11/1982 | de Oliveira | |
| 4,434,577 A | 3/1984 | Holtkamp | |
| D279,175 S | 6/1985 | Eklof | |
| D295,842 S | 5/1988 | Gay | |
| 4,993,186 A | 2/1991 | Immonen | |
| 5,020,261 A | 6/1991 | Lishman | |
| 5,081,790 A | 1/1992 | Hinton | |
| 5,410,839 A | 5/1995 | Granger | |
| D360,850 S | 8/1995 | Grosfillex | |
| 5,481,826 A * | 1/1996 | Dickinson | A01G 9/04 47/39 |

(Continued)

FOREIGN PATENT DOCUMENTS

| | | |
|---|---|---|
| CA | 1277495 | 12/1990 |
| EP | 2077713 | 12/2010 |
| WO | WO2010134906 | 11/2010 |

*Primary Examiner* — Trinh Nguyen
(74) *Attorney, Agent, or Firm* — McHale & Slavin, P.A.

(57) ABSTRACT

The invention involves an apparatus and system for a self-watering planter. The system includes a liquid container and a growth medium container secured together with snap type fasteners. A plurality of evenly distributed growth medium wells extends downwardly from the growth medium container into the liquid container for utilizing capillary action to transfer liquid into the growth medium. Root apertures are provided for the roots to extend into the liquid container. A snap together hanger, which includes snap-lock type fasteners, is provided for hanging the assembly from an overhead structure, and a filling window is provided to fill the liquid container.

16 Claims, 46 Drawing Sheets

(56) References Cited

U.S. PATENT DOCUMENTS

| | | | |
|---|---|---|---|
| D369,760 S | 5/1996 | Sanderson | |
| 5,535,547 A | 7/1996 | Brunengo | |
| 5,546,700 A | 8/1996 | Kumpf | |
| 5,596,839 A | 1/1997 | Ellis-El | |
| 5,622,004 A | 4/1997 | Gidge | |
| 5,638,638 A * | 6/1997 | Moskowitz | A01G 9/04 47/71 |
| 5,644,867 A * | 7/1997 | Gay | A01G 9/04 47/65.6 |
| 5,644,868 A | 7/1997 | Lui | |
| D384,907 S | 10/1997 | Moskowitz | |
| 5,857,289 A | 1/1999 | da Encarnacao | |
| 5,921,025 A | 7/1999 | Smith | |
| D422,936 S | 4/2000 | Tsou | |
| 6,079,156 A | 6/2000 | Colovic | |
| 6,134,832 A * | 10/2000 | Bokmiller | A01G 9/021 206/509 |
| 6,134,833 A | 10/2000 | Bachman et al. | |
| D436,887 S | 1/2001 | Fan | |
| 6,226,921 B1 | 5/2001 | Kang | |
| 6,237,283 B1 | 5/2001 | Nalbandian et al. | |
| 6,357,179 B1 | 3/2002 | Buss | |
| D456,307 S | 4/2002 | Fan | |
| 6,405,482 B1 | 6/2002 | Skaife | |
| D460,020 S | 7/2002 | Fan | |
| D460,021 S | 7/2002 | Fan | |
| D468,662 S | 1/2003 | Fan | |
| 6,505,440 B1 | 1/2003 | Lai | |
| 6,584,730 B1 | 7/2003 | Mai | |
| 6,691,460 B1 | 2/2004 | Lee | |
| D491,487 S | 6/2004 | Buss | |
| D498,432 S | 11/2004 | Fan | |
| 6,862,843 B2 * | 3/2005 | Missry | A01G 13/0212 47/65.5 |
| 7,082,717 B1 | 8/2006 | Wang | |
| 7,634,871 B2 | 12/2009 | DiPaolo et al. | |
| 7,703,240 B2 | 4/2010 | Watson et al. | |
| 7,730,666 B2 | 6/2010 | Spray | |
| D635,486 S | 4/2011 | Bodum | |
| 7,966,768 B2 * | 6/2011 | DiPaolo | A01G 9/124 47/39 |
| D653,156 S | 1/2012 | Phelps et al. | |
| 8,528,252 B2 | 9/2013 | Griebel | |
| 2011/0036006 A1 | 2/2011 | Griebel | |
| 2011/0258928 A1 | 10/2011 | Adams | |

* cited by examiner

WICKING PLANTER SYSTEM

RELATED APPLICATIONS

This application is related to U.S. Design Patent Application No. 29/465,455, entitled "WICKING PLANTER", filed Aug. 28, 2013; U.S. Design Patent Application No. 29/467,388, entitled "WICKING PLANTER", filed Sep. 18, 2013; and U.S. Design Patent Application No. 29/468,735, entitled "WICKING PLANTER", filed Oct. 2, 2013. The contents of which the above referenced applications are incorporated herein by reference.

FIELD OF INVENTION

The present invention generally relates to planters, and more particularly to a system for constructing a series of wicking planters with ease of use features.

BACKGROUND INFORMATION

Because providing water to potted plants is of the upmost importance for maintaining a healthy atmosphere for the plant, a number of self-watering container systems have been developed. These systems generally include a lower reservoir for containing a liquid, such as water, and an upper portion that contains a growing medium, such as dirt, and the plant.

Various devices and methods for transferring the water from the bottom to the top have been devised, including wicks. For example, U.S. Pat. No. 3,220,144 to Green discloses a system which includes a feed tube, a reservoir and a water tower. As explained in Green, water travels from the tower through a port to the reservoir. The water is then absorbed through the feed tube, which is packed with sand and disposed within a planter, by capillary action.

U.S. Pat. No. 3,676,953 to Delogne discloses wicks, which extend from a plant container into a water-filled reservoir; water is thus supplied to plants therein by capillary action.

U.S. Pat. No. 4,434,577 to Holtkamp discloses a similar invention which provides for capillary transmission of water from a water containing tray to a pot by way of a water pervious pad having one or more hinged, movable tabs which can be bent downwardly through an opening for submergence in the water in the tray.

A drawback to this type of plant container construction relates to the inability to adequately transfer sufficient liquid to keep the growing medium at the proper moisture level without the aid of heat for the wicking process.

Another known approach is to create a small area where the growing medium extends into the reservoir. However, without a sufficient volume of growing medium, the liquid is inadequately distributed throughout the growing medium.

An additional drawback to the prior art relates to the connectors utilized to connect the liquid reservoir to the growth medium container. The prior art connectors are difficult to align and assemble, and many require tools for proper assembly. There are ergonomic needs that a self-watering planter system must satisfy in order to achieve acceptance by the end user. The system must be easily and quickly assembled using minimal hardware and requiring a minimal number of tools. Further, the system should not require excessive strength to assemble or include heavy component parts. Moreover, the system must assemble together in such a way so as not to detract from the aesthetic appearance of the self-watering planter system.

Thus, the present invention provides a self-watering planter system which overcomes the disadvantages of prior art self-watering systems. The self-watering planter system of the present invention not only provides for relative ease of assembly, it also permits assembly without the need for tools. The present invention also provides a self-watering planter system which evenly distributes liquid throughout the growing medium, thereby eliminating the need for daily plant watering.

SUMMARY OF THE INVENTION

Briefly, the invention involves an apparatus and system for a self-watering planter. The system includes a liquid container and a growth medium container secured together with snap type fasteners. A plurality of evenly distributed growth medium wells extends downwardly from the growth medium container into the liquid container for utilizing capillary action to transfer liquid into the growth medium. Root apertures are provided for the roots to extend into the liquid container. A snap together hanger, which includes snap-lock type fasteners, is provided for hanging the assembly from an overhead structure, and a filling window is provided to fill the reservoir.

Accordingly, it is an objective of the present invention to provide a self-watering planter system.

It is a further objective of the present invention to provide a self-watering planter system that utilizes snap together construction.

It is yet a further objective of the present invention to provide a snap-together fastener for self-watering planter systems that utilizes ramp lock type fasteners.

It is another objective of the instant invention to provide a self-watering planter system wherein the snap-together fasteners are located above the upper level of the liquid in the liquid container.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENTS

Figure 1:
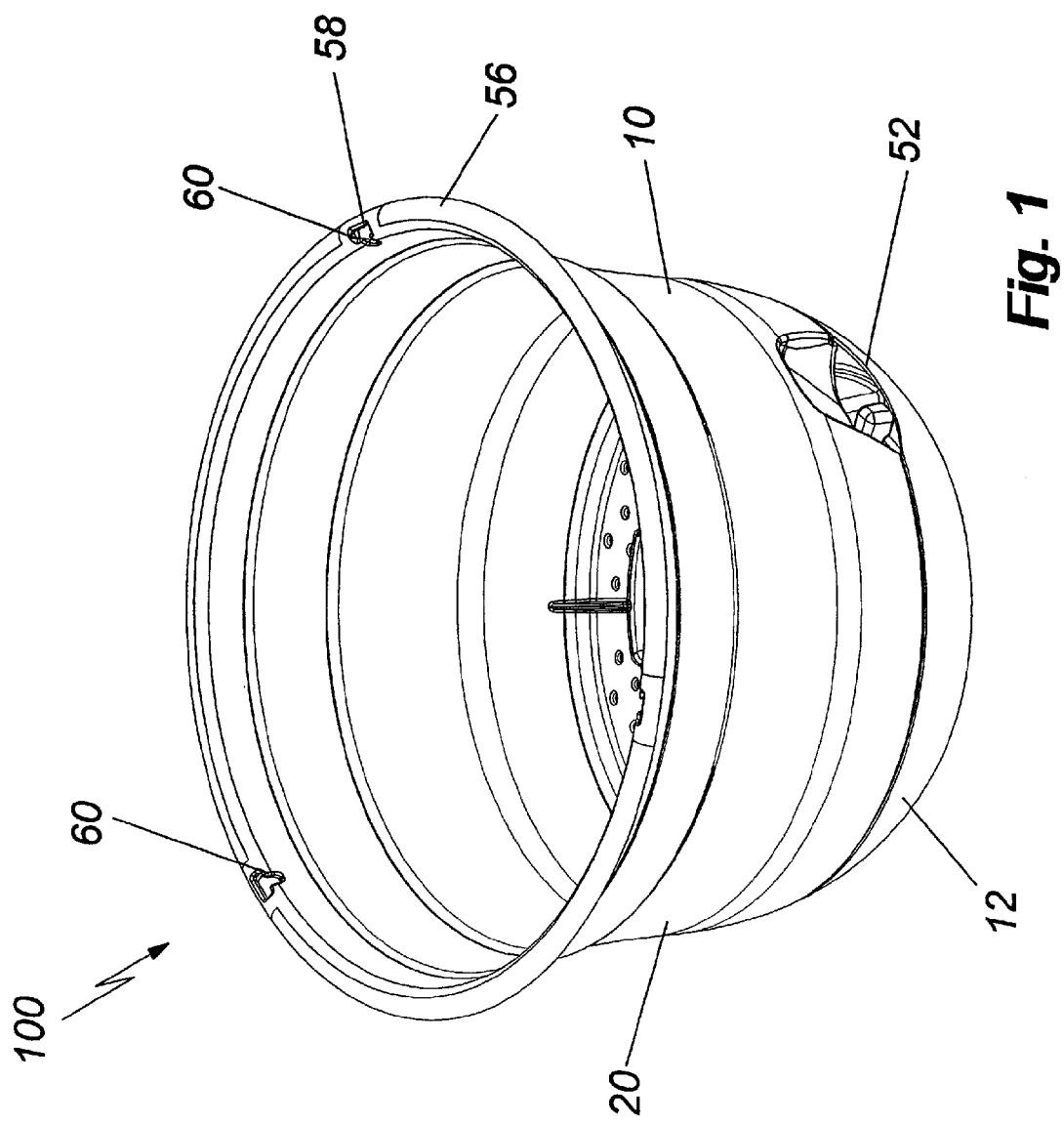
FIG. 1 is a top perspective view of one embodiment of the present invention.
Figure 2:
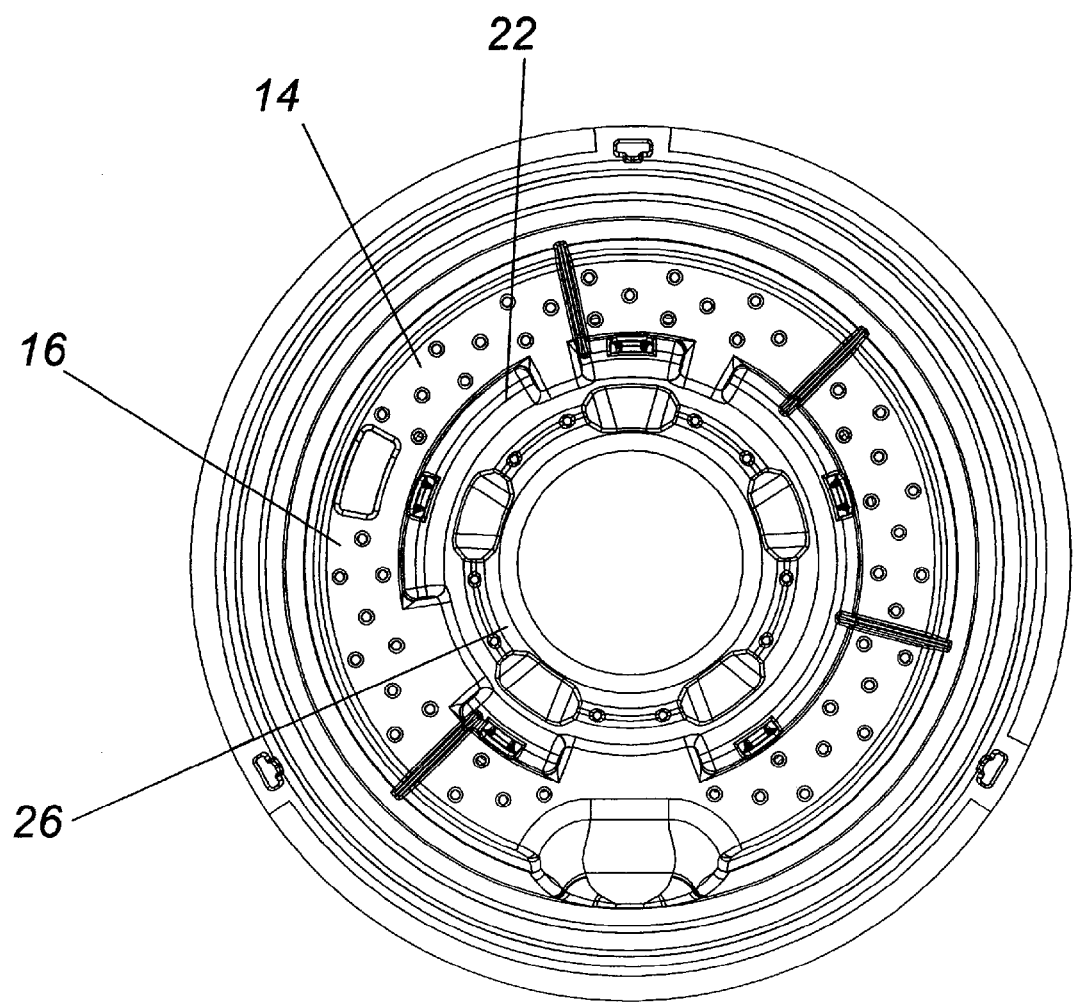
FIG. 2 is a top view of the embodiment shown in FIG. 1 illustrating the construction of the inner portion of the medium container.
Figure 3:
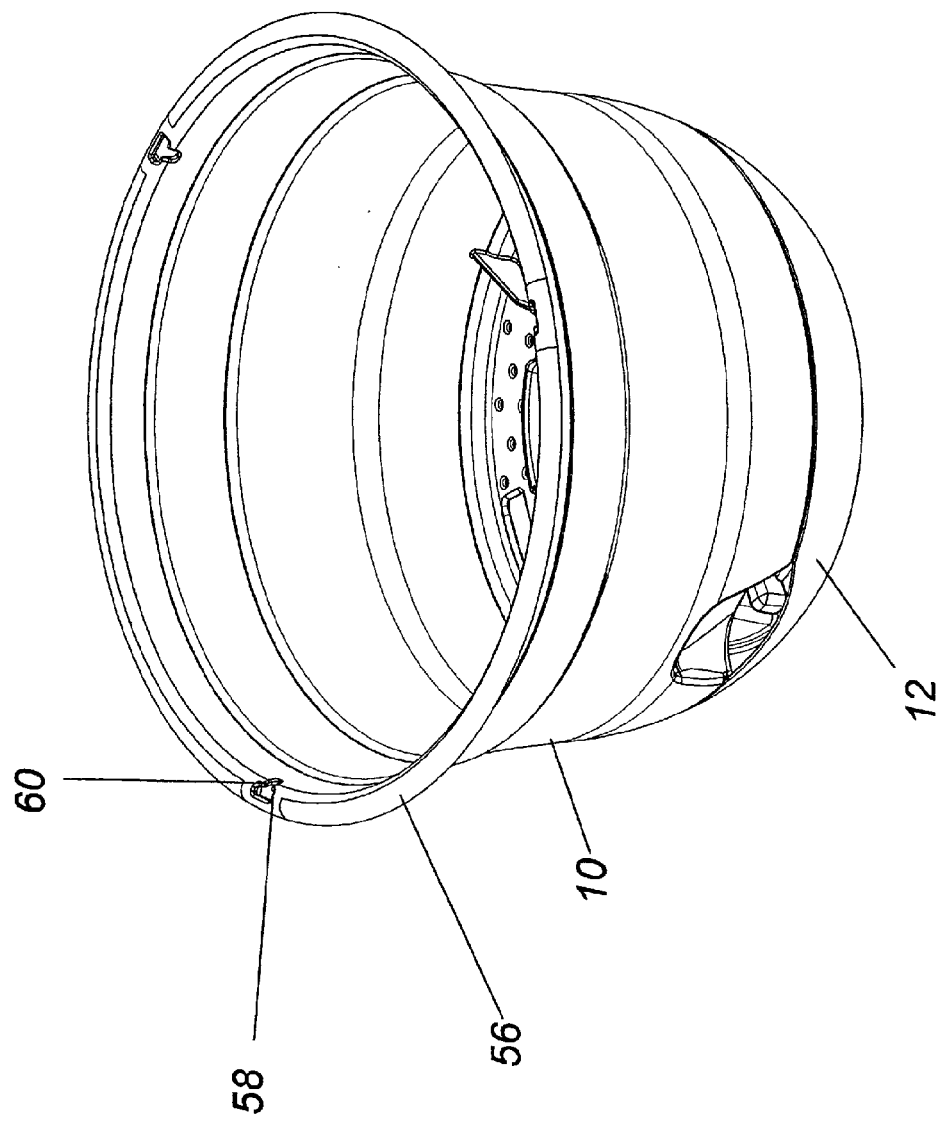
FIG. 3 is a top perspective view of the embodiment shown in FIG. 1, illustrating the assembled self-watering planter.
Figure 4:
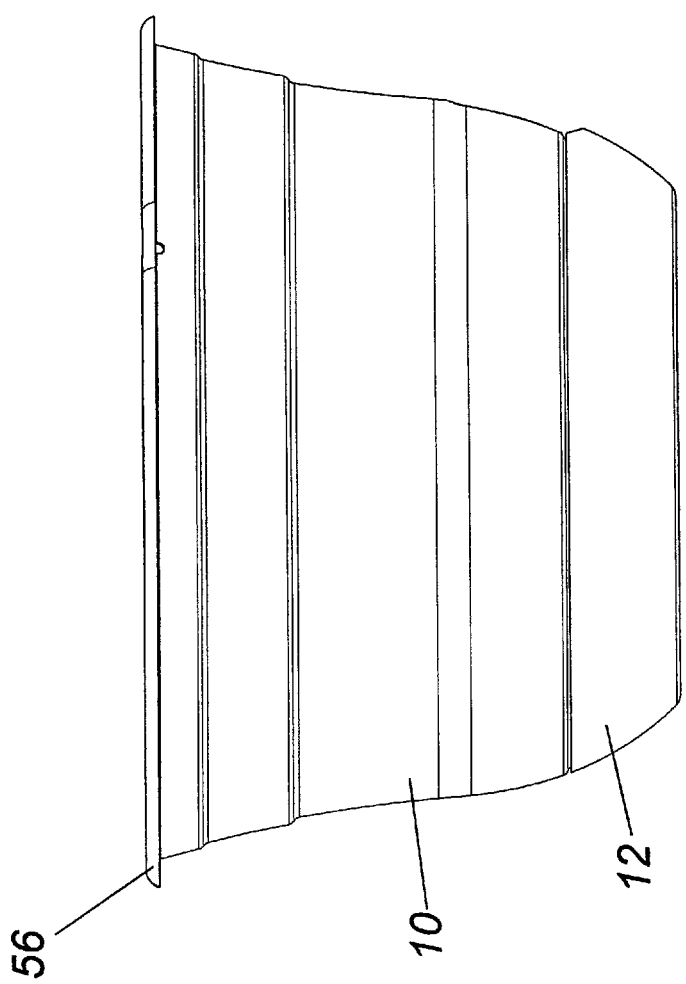
FIG. 4 is a left side view of the embodiment shown in FIG. 1.
Figure 5:
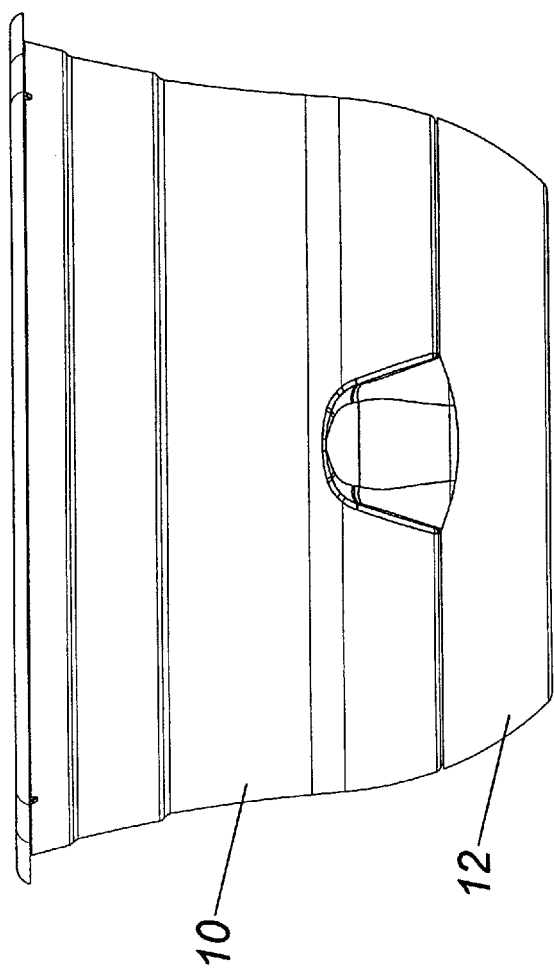
FIG. 5 is a front view of the embodiment shown in FIG. 1.
Figure 6:
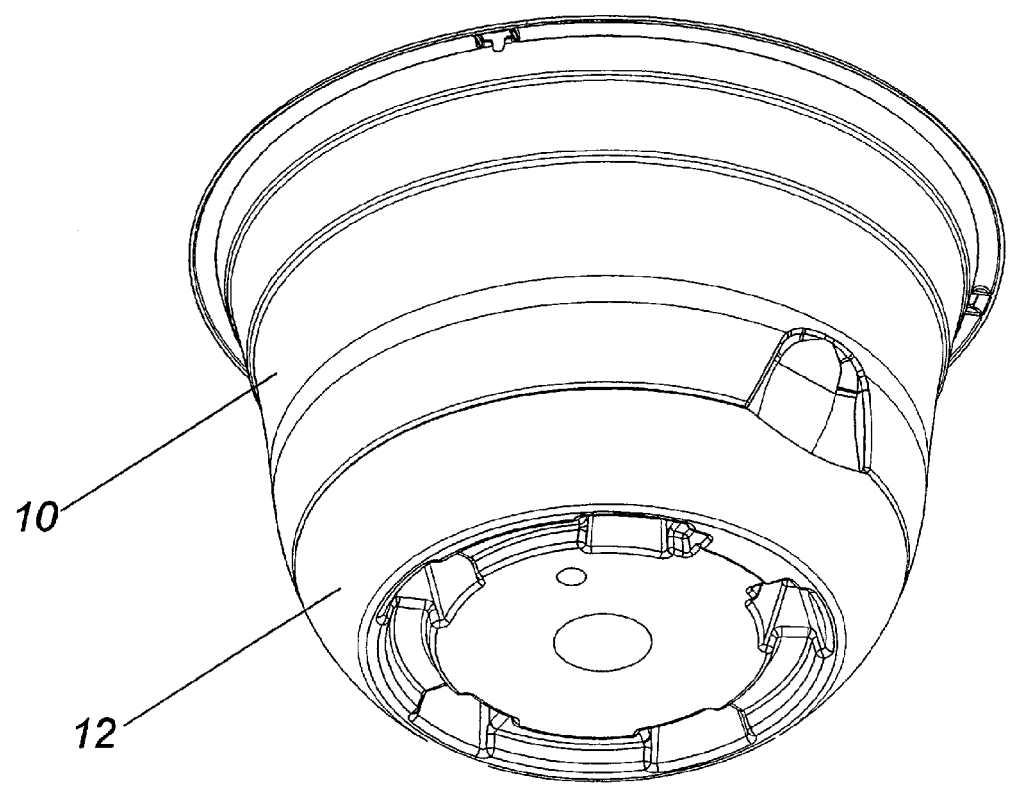
FIG. 6 is a bottom perspective view of the embodiment shown in FIG. 1.
Figure 7:
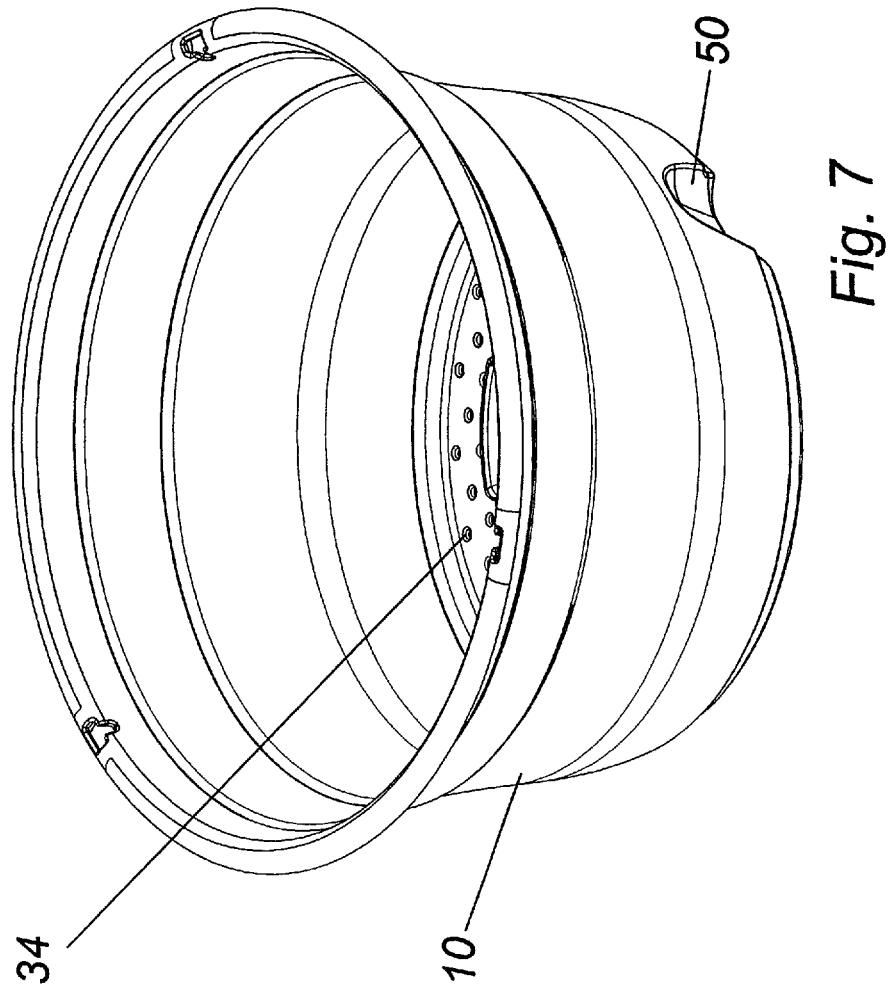
FIG. 7 is a top perspective view of one embodiment of the growth medium container.
Figure 8:
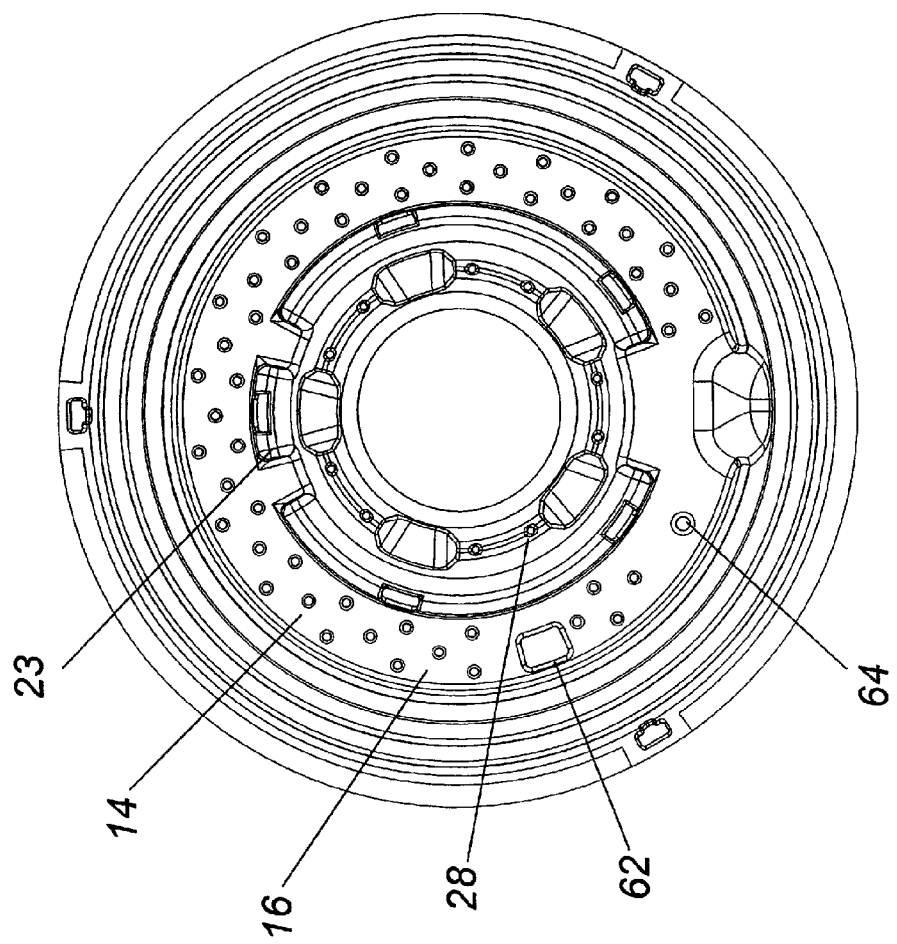
FIG. 8 is a top view of the growth medium container shown in FIG. 7.
Figure 9:
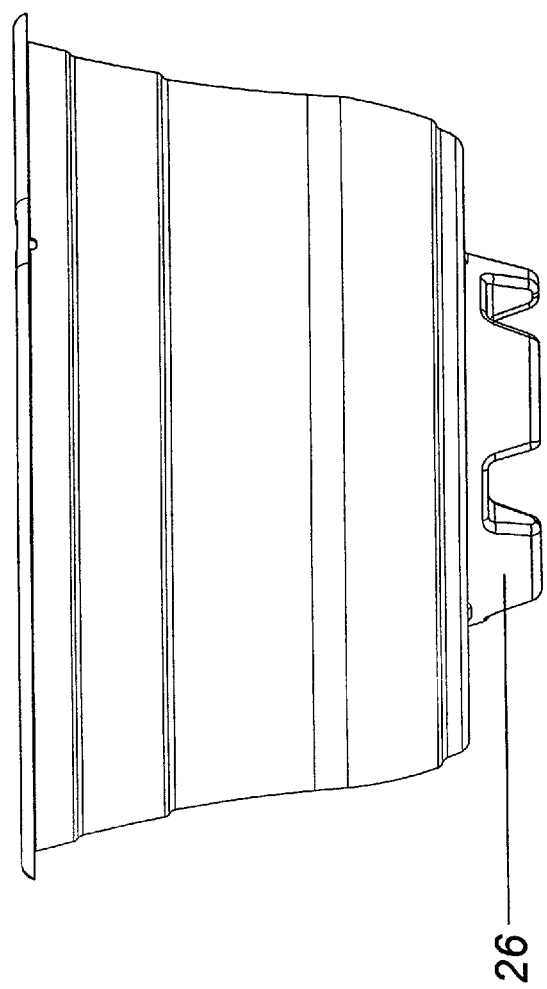
FIG. 9 is a right side view of the growth medium container shown in FIG. 7.
Figure 10:
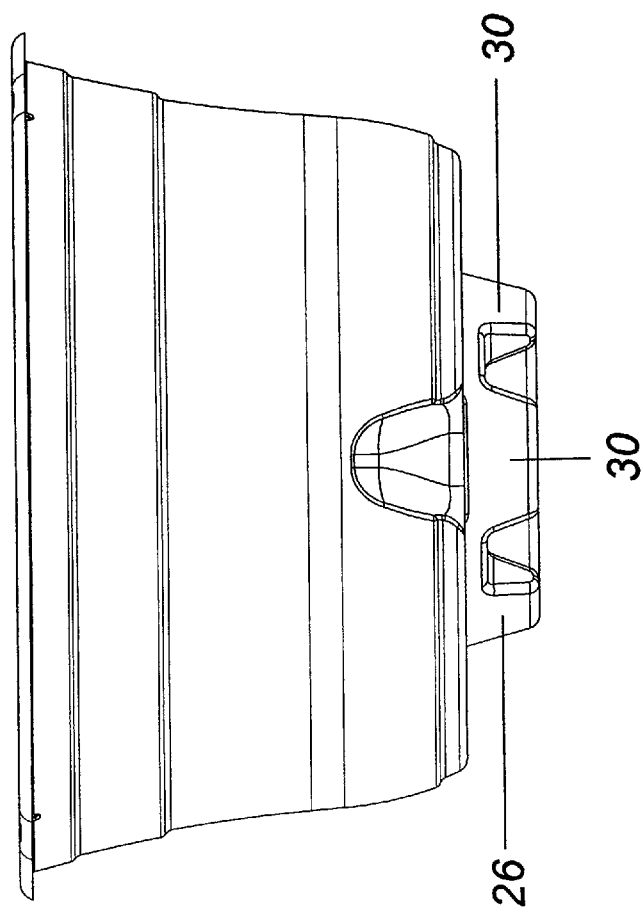
FIG. 10 is a front view of the growth medium container shown in FIG. 7.
Figure 11:
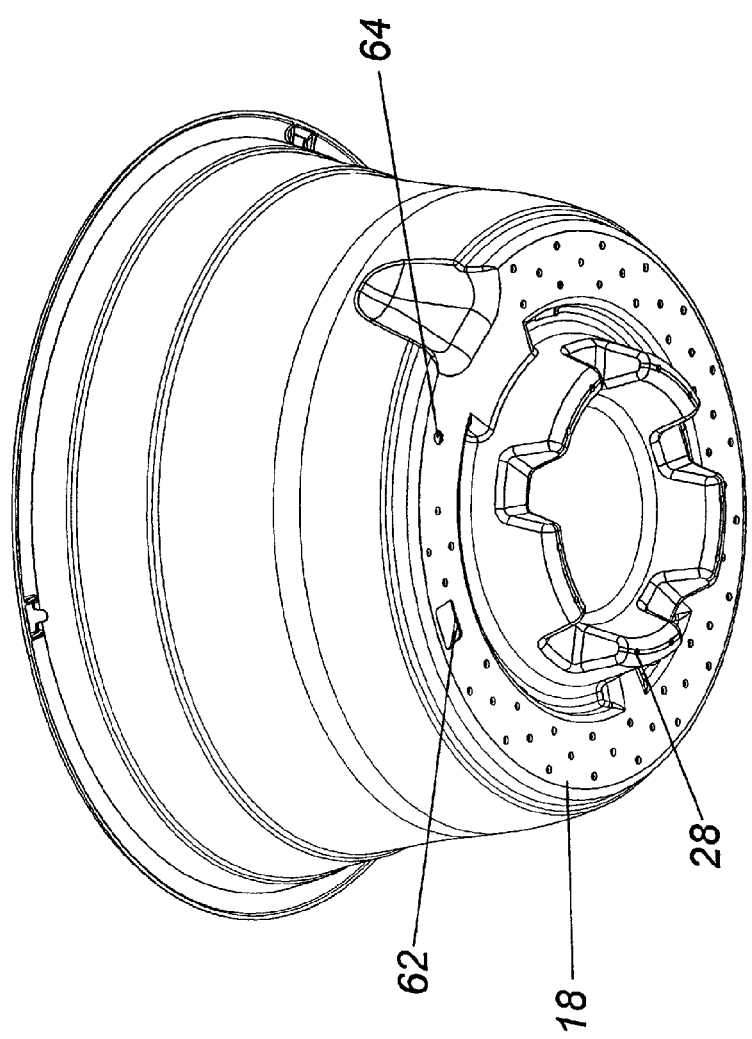
FIG. 11 is a bottom perspective view of the growth medium container shown in FIG. 7, illustrating the growth medium wells, root apertures and fastener tunnel.
Figure 12:
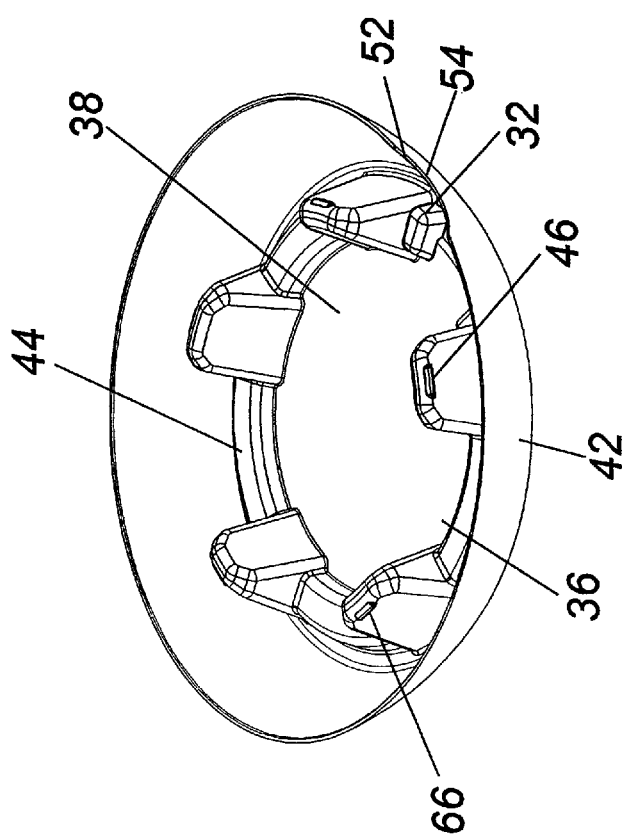
FIG. 12 is a top perspective view of one embodiment of the liquid container, illustrating the fastener stanchions.
Figure 13:
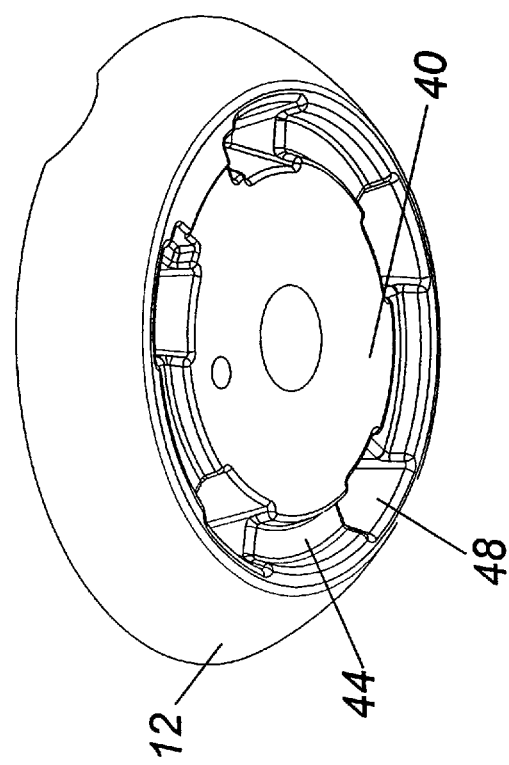
FIG. 13 is a bottom perspective view of the liquid container shown in FIG. 7 or 12.
Figure 14:
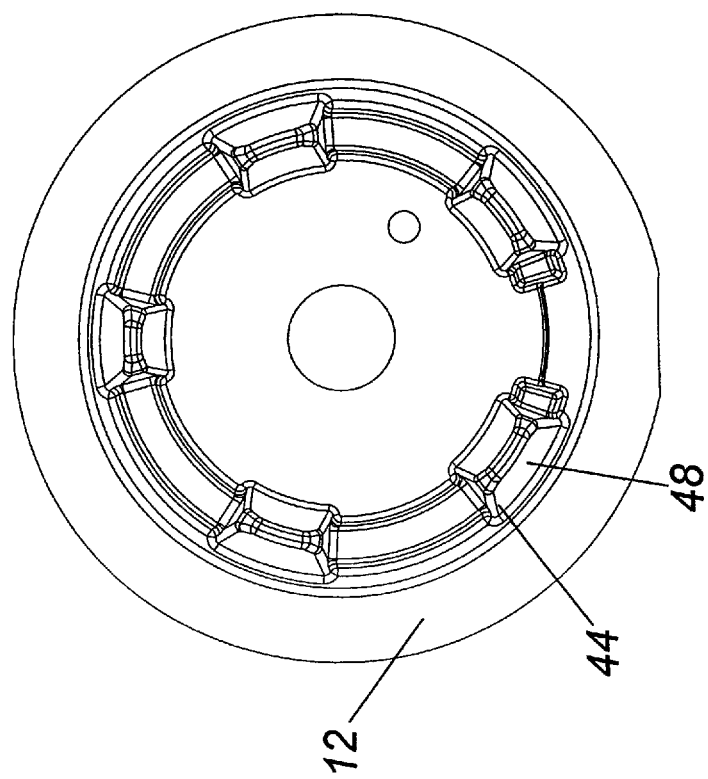
FIG. 14 is a bottom view of the liquid container shown in FIG. 1.
Figure 15:
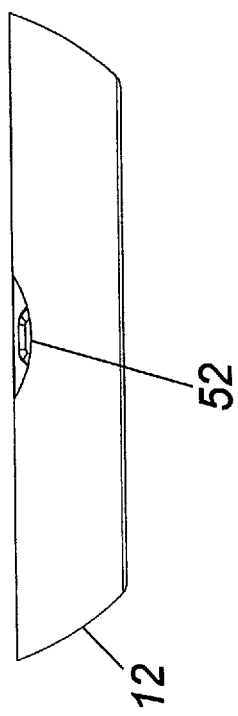
FIG. 15 is a front view of the liquid container shown in FIG. 1.
Figure 16:
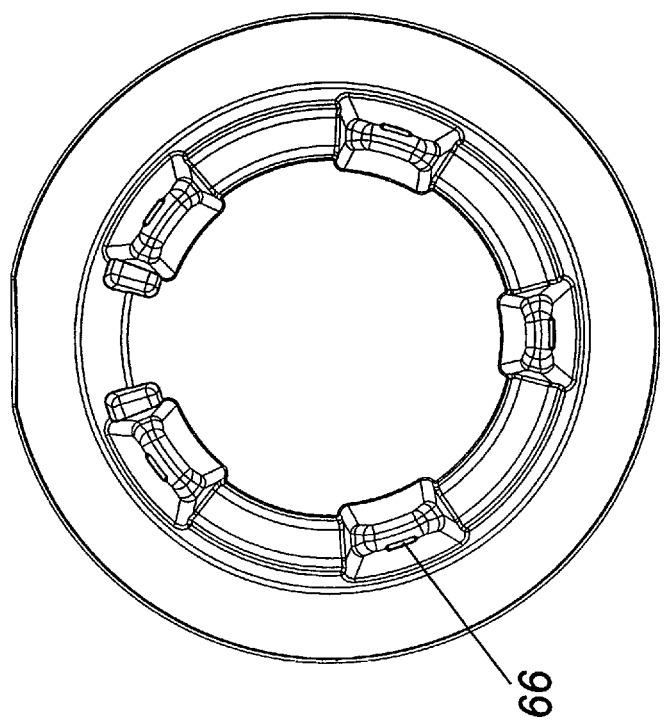
FIG. 16 is a top view of the liquid container shown in FIG. 1.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring generally to FIGS. 1-46, a self-watering planter system 100 for cultivating plants is illustrated. The system generally includes a growth medium container 10 for containing a growth medium, such as dirt, for growing plants, and a liquid container 12 for containment of liquid for plants in the growth medium container.

Referring to FIGS. 1-20, one embodiment of the self-watering plantar system is illustrated with a round growth medium container 10. In this embodiment the growth medium container 10 is generally circular, and includes a base panel 14 having a top surface 16 and a bottom surface 18, at least one sidewall 20 integrally formed to the base panel 14 at a generally obtuse angle for containing a growth medium for plants. The base panel 14 includes a plurality of apertures 34 for through growth of plant roots, whereby the plant roots may directly engage liquid within the liquid container 12. The base panel 14 further includes a tunnel portion 22 (FIG. 20) extending upwardly from the top surface 16 of the base panel 14. The tunnel portion 22 includes a first portion of a securing assembly 24 for securing the growth medium container 10 to the liquid container 12. The base panel 14 also includes an annular well portion 26. The annular well portion 26 extends downwardly with respect to the bottom surface 18 of the base panel 14 to a position proximate the upper surface 38 of the bottom panel 36 of the liquid container 12. The bottom portion of the annular well portion 26 includes a plurality of apertures 28 for transfer of liquid to and from the growth medium container 10. In this manner, growth medium is allowed to extend into the annular well portion 26, and thus, the liquid in the liquid container 12 whereby the liquid is allowed to transfer throughout the growth medium by capillary action. Shown here in the preferred embodiment, the annular well portion 26 is serrated to create a plurality of square bottomed well serrations 30. In this embodiment, the liquid container 12 includes at least one key member 32 positioned to cooperate with the square bottomed serrations 30 to index the attachment of the liquid container 12 to the growth medium container 10. In the preferred embodiment, the growth medium container 10 includes a funnel indention 50 positioned at a junction of the base panel 14 and the sidewall 20 for allowing liquid to be poured into the liquid container 12.

Referring to FIGS. 1-20 and to FIGS. 12-20 for more detail, a liquid container 12 for holding a small amount of water for use by the plants in the growth medium container 10 is illustrated. The liquid container 12 includes a bottom panel 36 having an upper surface 38 and a lower surface 40.

A continuous sidewall 42 is integrally formed to the bottom panel 36 to create a watertight container having an open top. The bottom panel 36 includes an annular shaped post 44 extending upwardly with respect to the upper surface 38, the post including a second portion 46 of the securing assembly for securing the growth medium container 10 to the liquid container 12. In the preferred embodiment the annular shaped post 44 is broken into segments 48. The segments 48 of the annular post 44 match segments 23 of the tunnel 22, so that the segments 23 of the tunnel 22 and segments 48 of the annular post 44 cooperate in an intermeshed manner to index the attachment of the liquid container 12 to the growth medium container 10. In the preferred embodiment, the liquid container 12 includes a spillway 52 positioned in the liquid container sidewall 42, the spillway 52 having an upper surface 54 that is below the top surface of the sidewall 42, whereby excess liquid is allowed to escape over the spillway to prevent oversaturation of the growth medium.

Referring to FIGS. 1-11, the growth medium container 10 includes a depending lip 56 extending around the perimeter of the top portion thereof for providing strength to the growth medium container 10. The depending lip 56 includes a plurality of hanger apertures 58 extending therethrough for the attachment of a hanging support assembly (not shown) for hanging the self-watering planter system 100 from an overhead support member. The hanger apertures 58 preferably include a snap-lock feature, whereby a portion of the hanging support assembly is constructed and arranged to snap into the snap-lock feature for retention thereof. The base panel 14 of the growth medium container 10 includes at least one retention aperture 62 which may be accompanied by a snap lock aperture 64 (FIG. 8) for the retention of the hanging support assembly during storage and shipment of said self-watering planter. In this embodiment, the hanger is pulled through the retention aperture and locked in place with the snap lock aperture 64. For use, the user merely snaps the hanger free from the snap lock aperture to release the hanger to be snapped into the snap-lock feature 60 in the depending lip 56.

Figure 17:
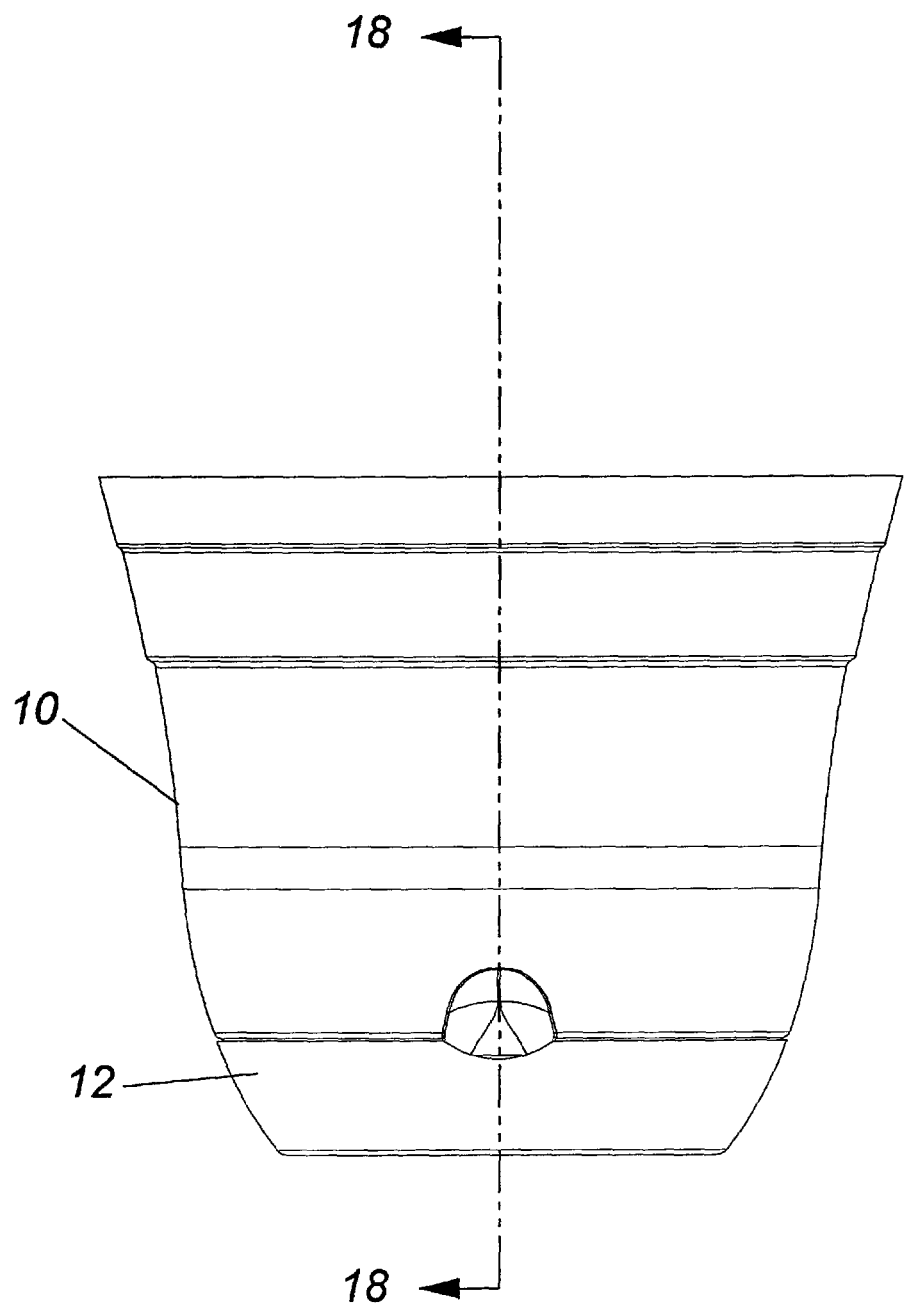
FIG. 17 is a side view of one embodiment of the present invention, illustrating a non-hanging type planter.
Figure 18:
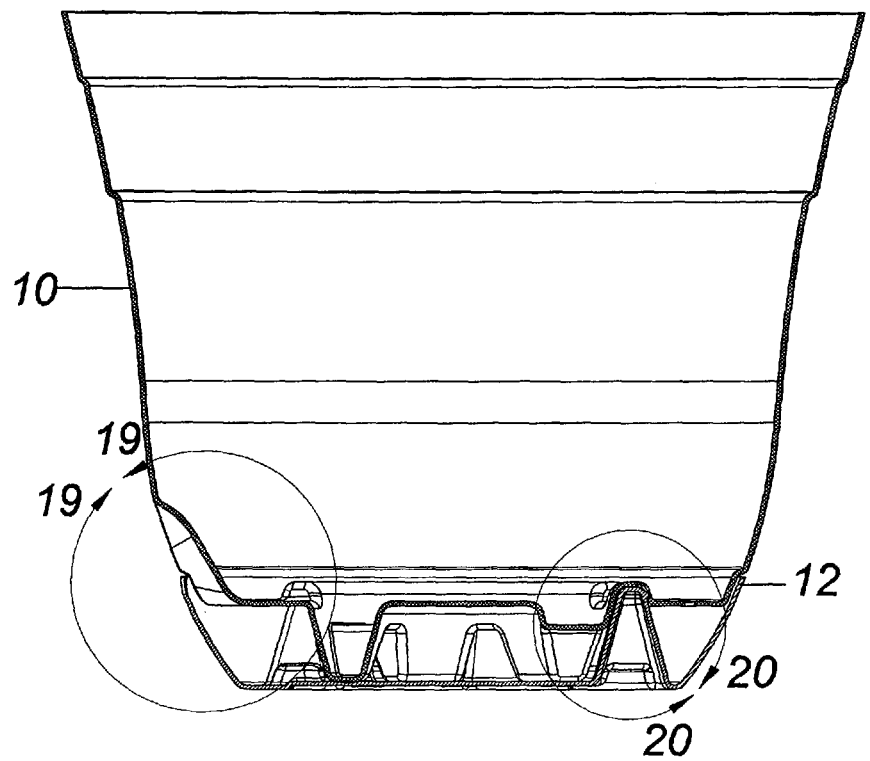
FIG. 18 is a section view taken along lines 18-18 of FIG. 17.
Figure 19:
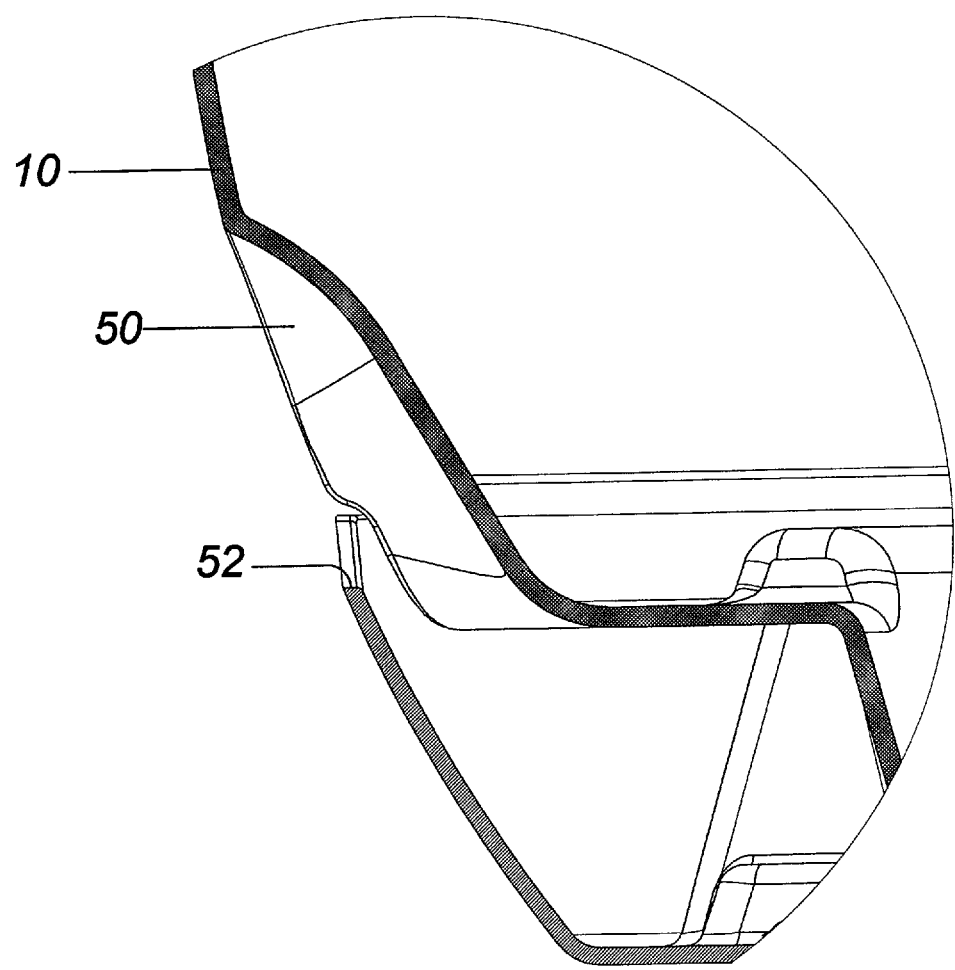
FIG. 19 is a partial section view taken along lines 19-19 of FIG. 18, illustrating the liquid window.
Figure 20:
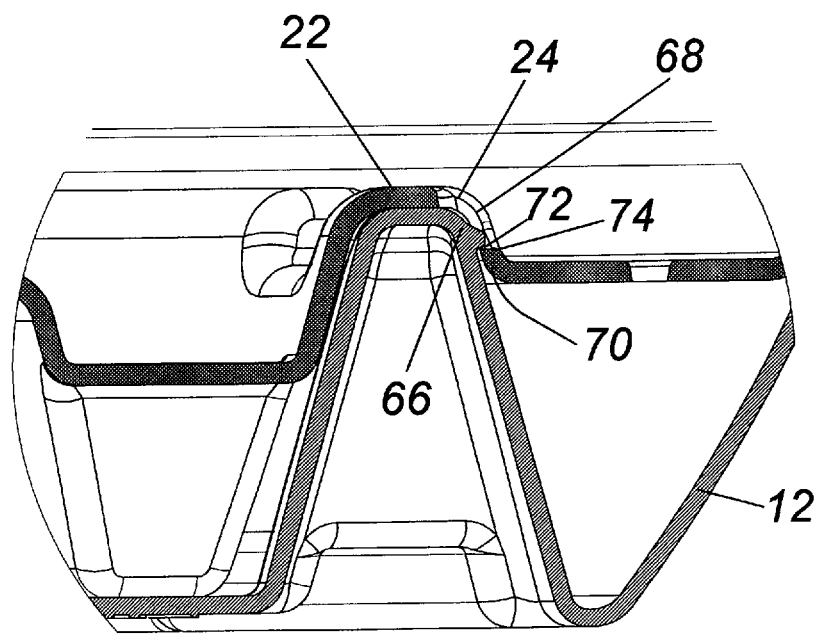
FIG. 20 is a partial section view taken along lines 20-20 of FIG. 18, illustrating engagement of the snap-together fastener.
Figure 21:
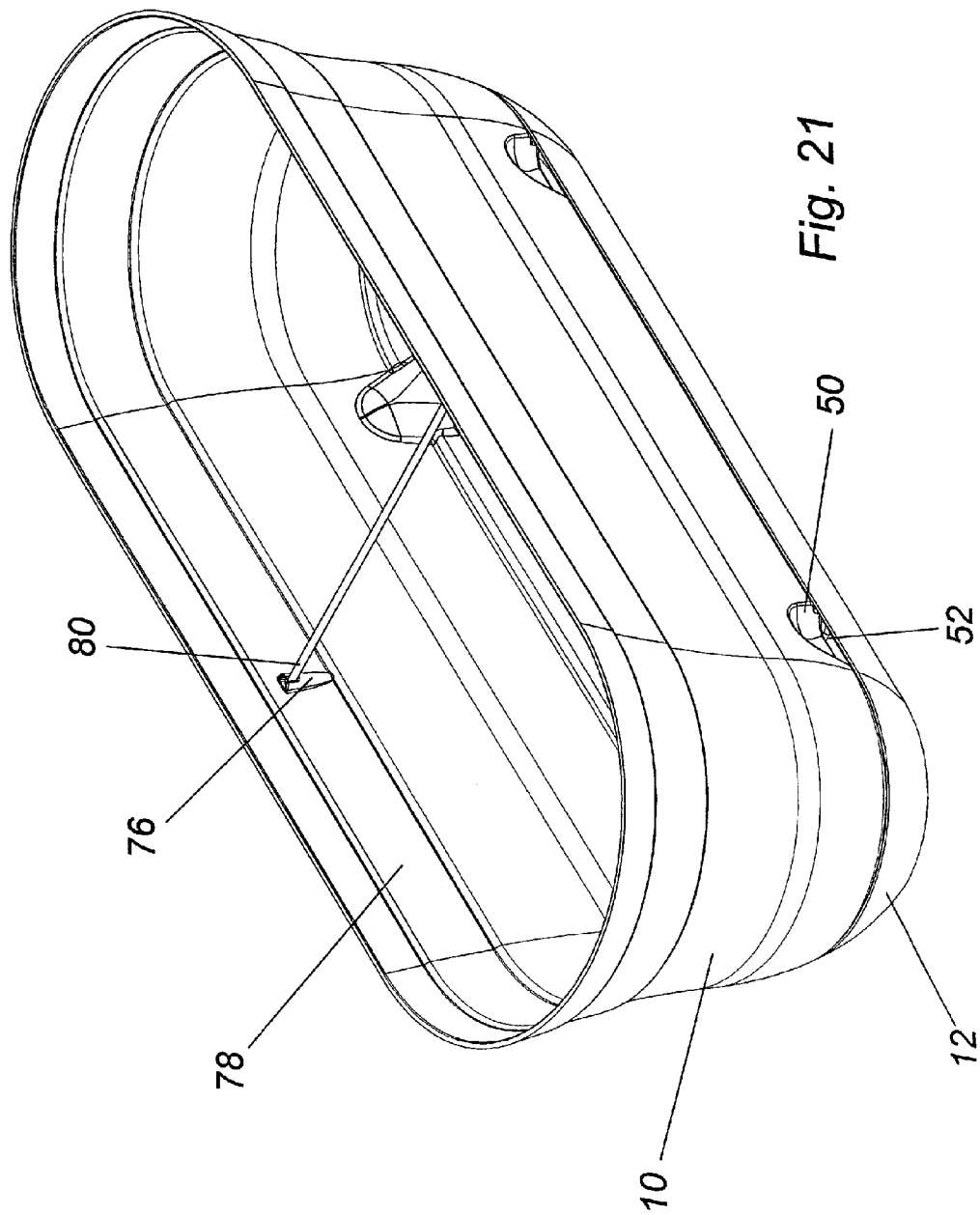
FIG. 21 is a top left perspective view of one embodiment of the self-watering planter, illustrating a window sill model.
Figure 22:
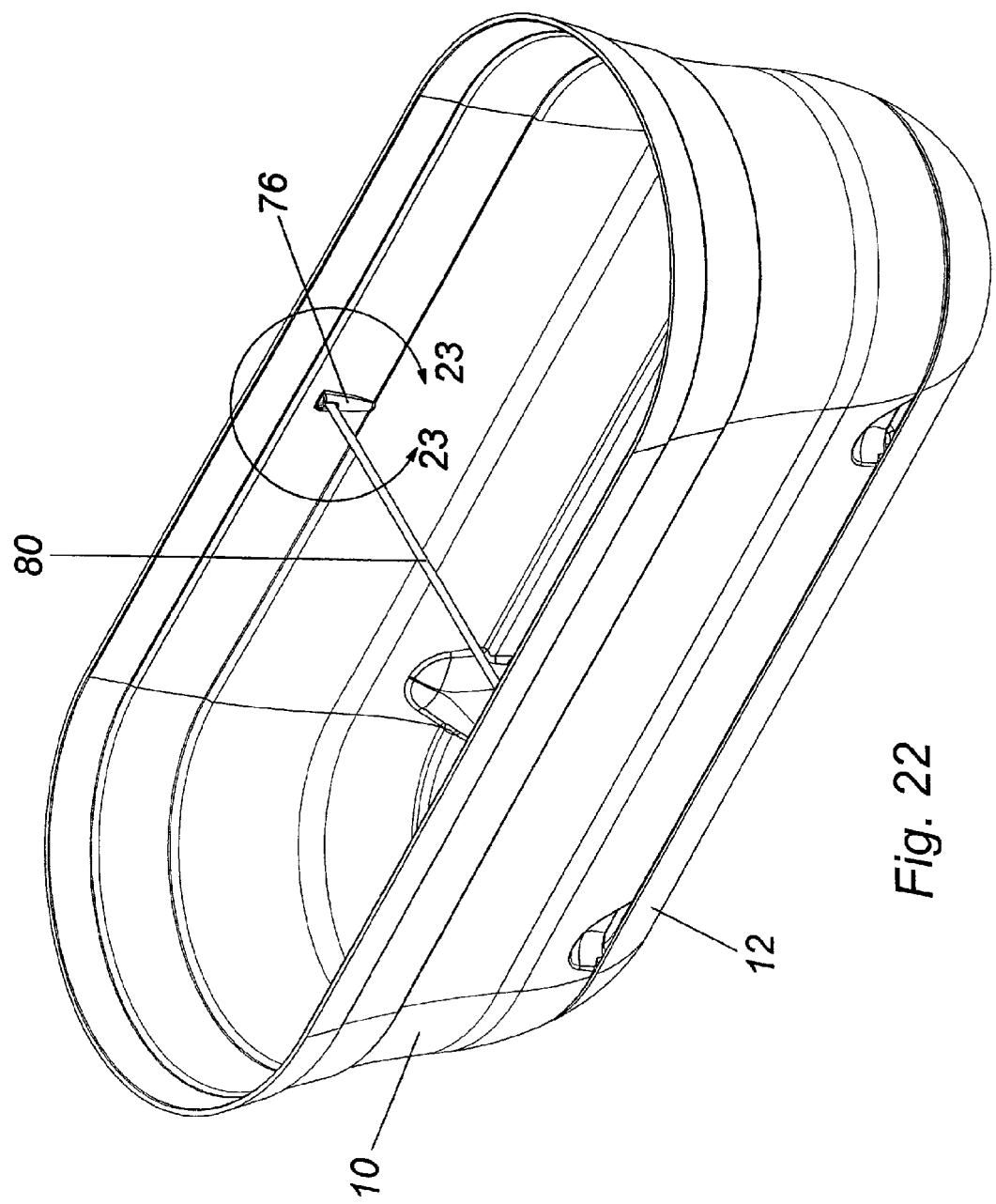
FIG. 22 is a top right perspective view of the embodiment illustrated in FIG. 21.
Figure 23:
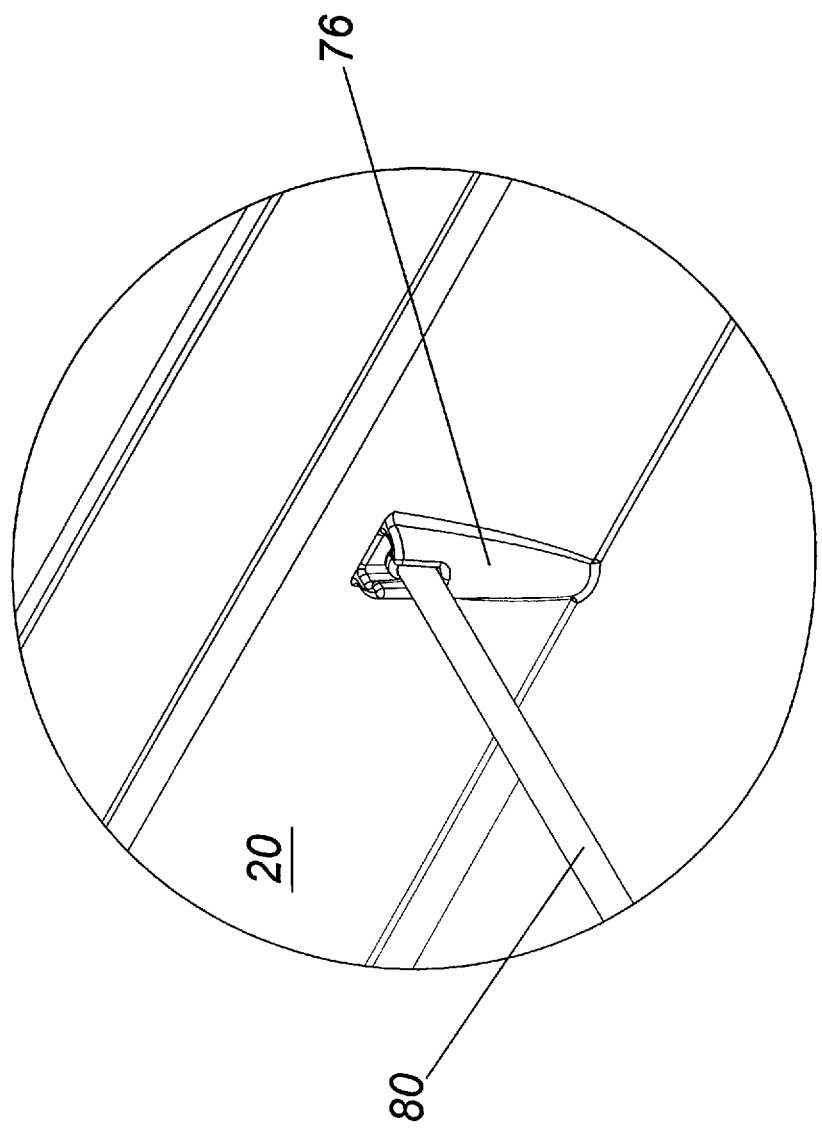
FIG. 23 is a partial perspective view taken along lines 23-23 of FIG. 22, illustrating assembly of the tie rod member.
Figure 24:
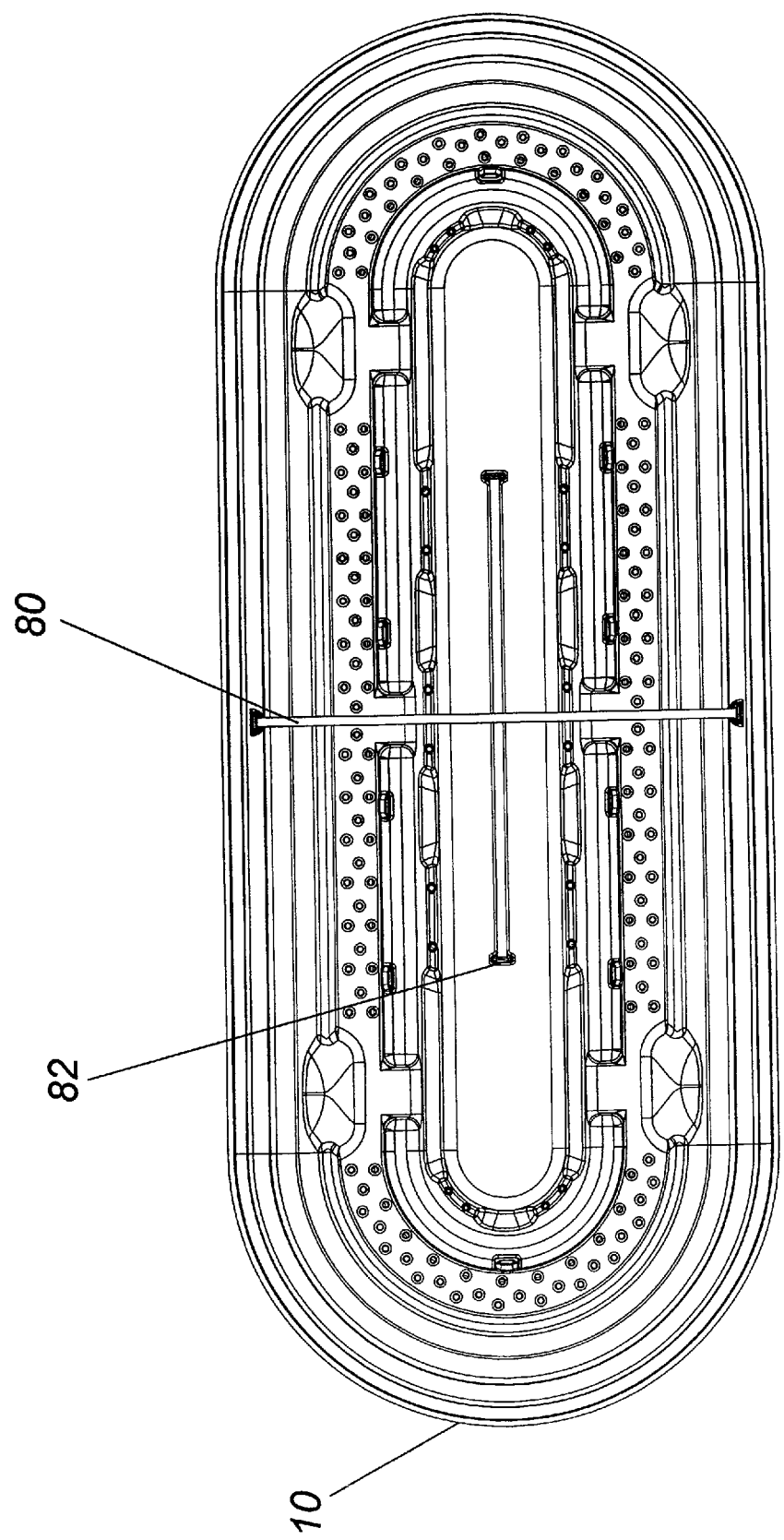
FIG. 24 is a top view of the embodiment shown in FIG. 21.
Figure 25:
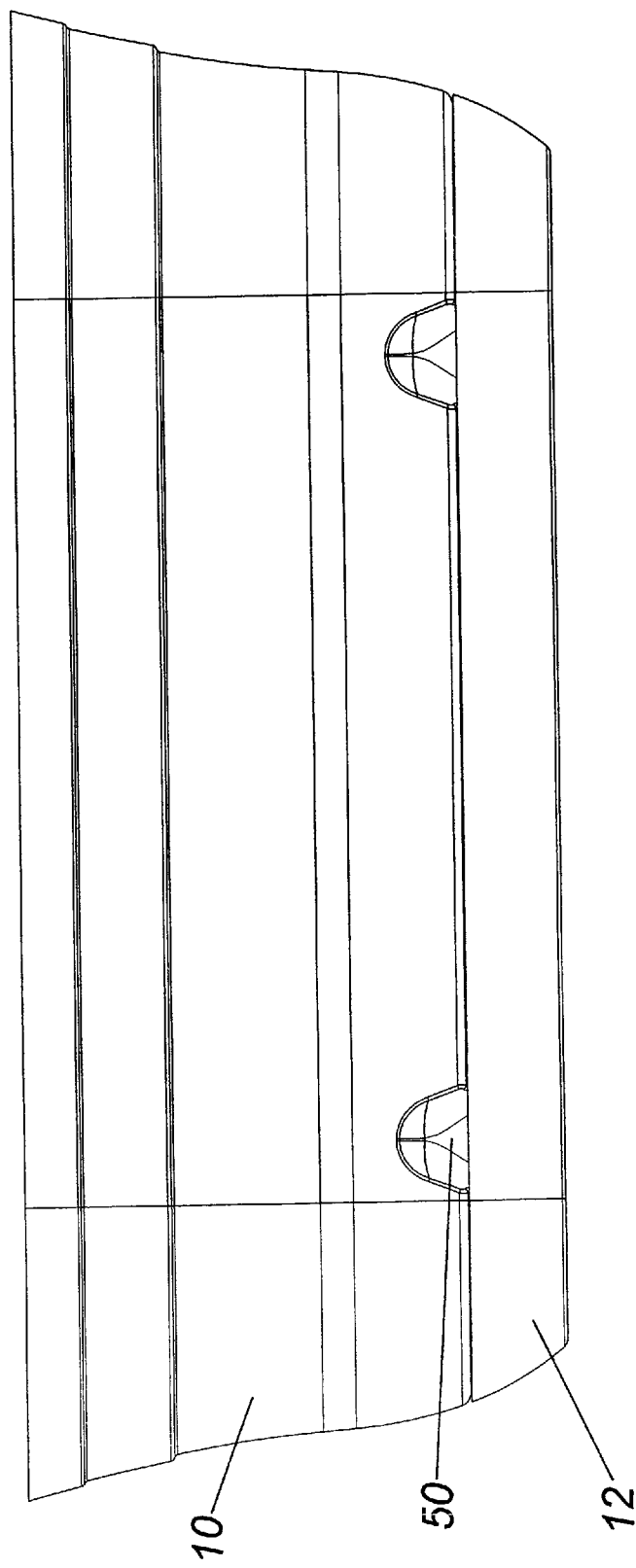
FIG. 25 is a front view of the embodiment shown in FIG. 21.
Figure 26:
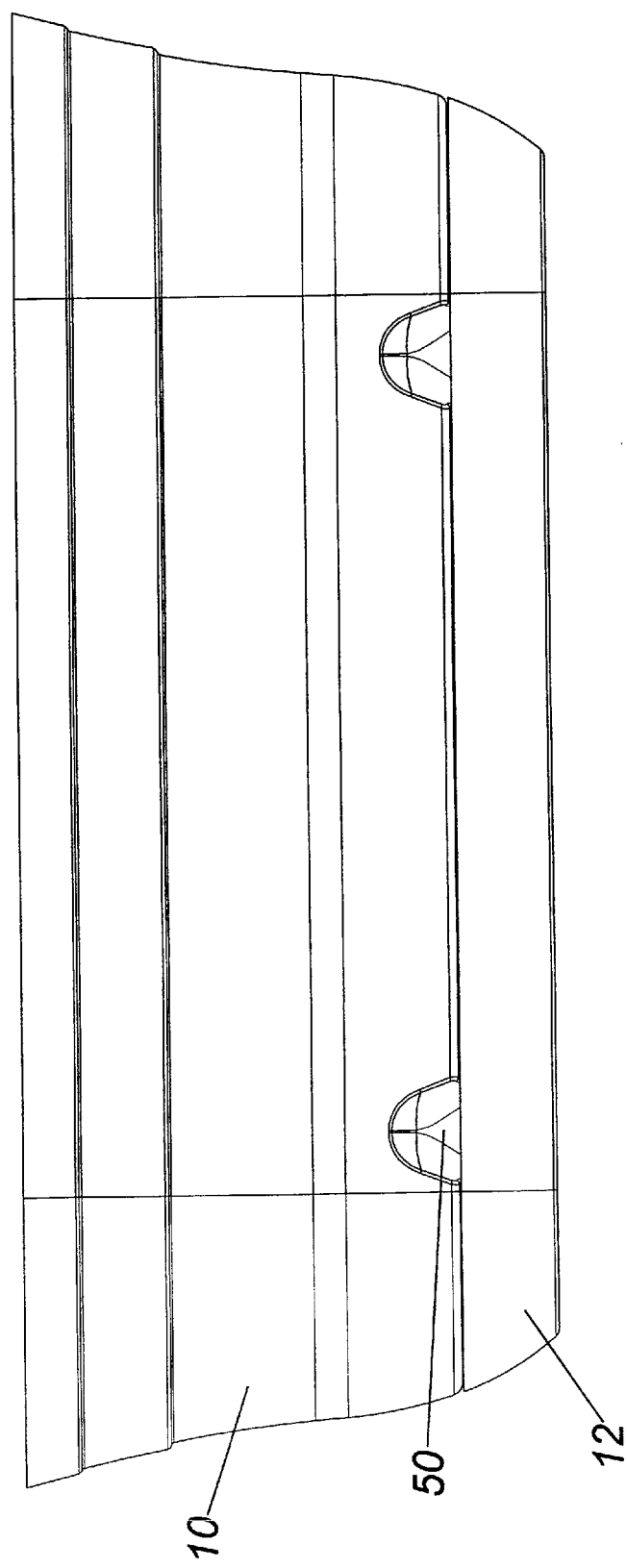
FIG. 26 is a rear view of the embodiment shown in FIG. 21.
Figure 27:
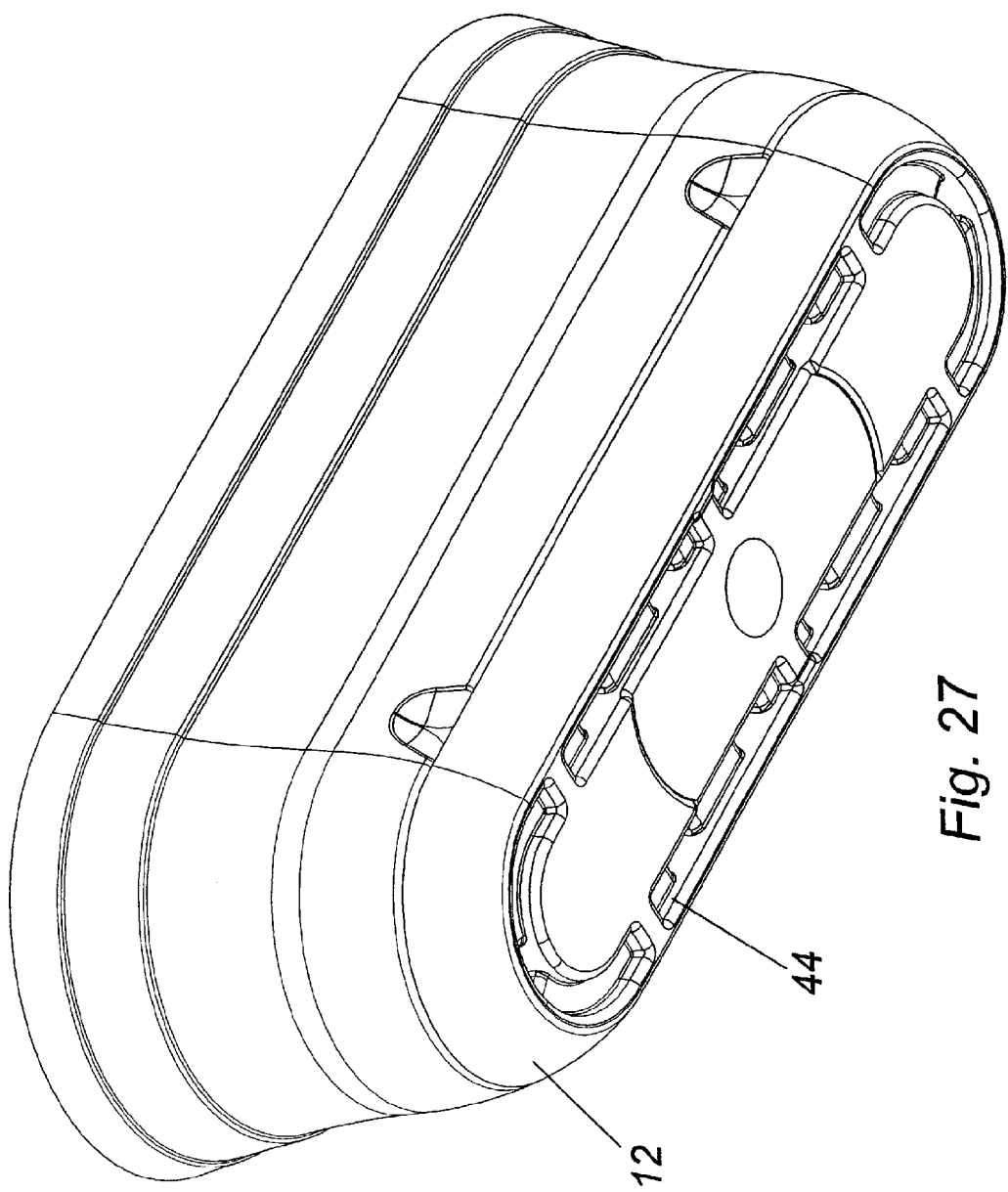
FIG. 27 is a bottom perspective view of the embodiment shown in FIG. 21.
Figure 28:
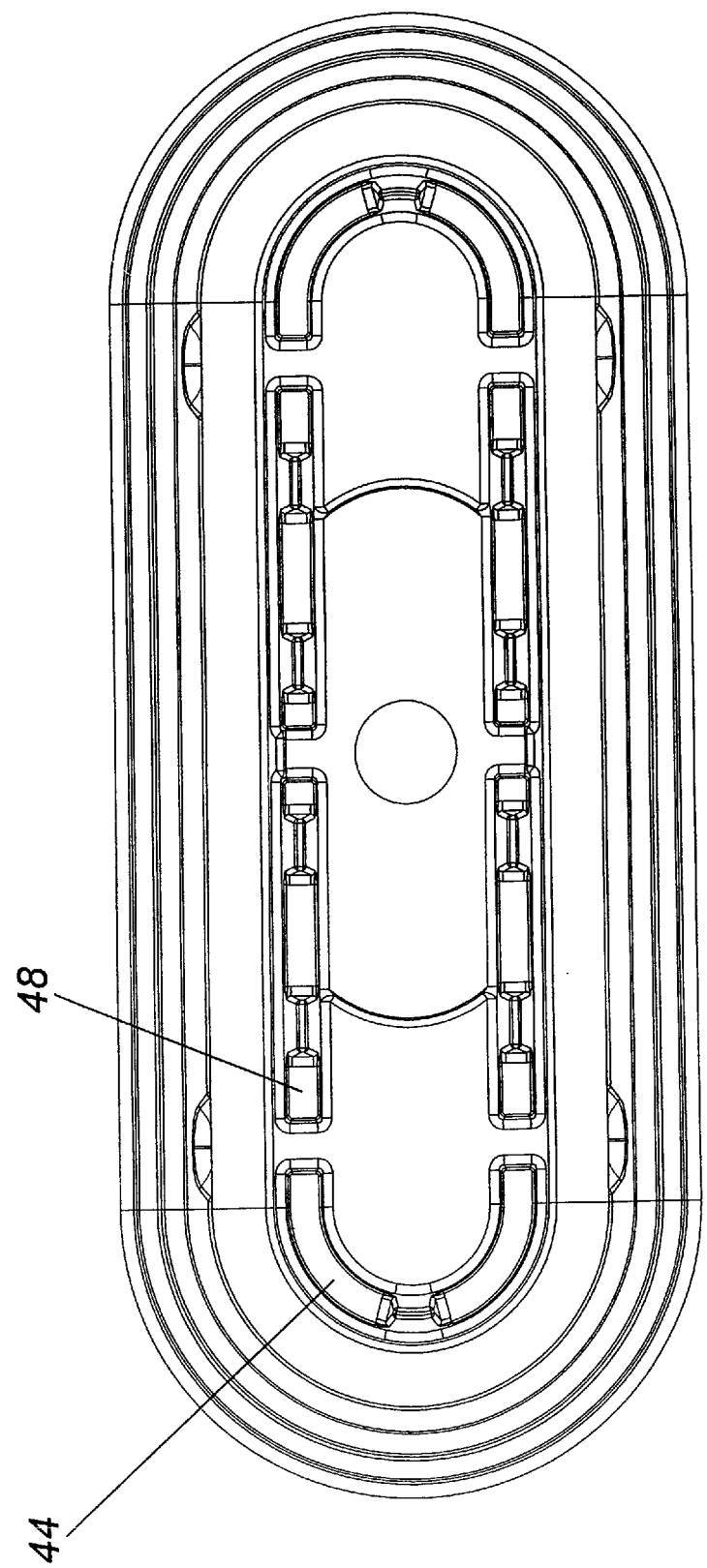
FIG. 28 is a bottom view of the embodiment shown in FIG. 21.
Figure 29:
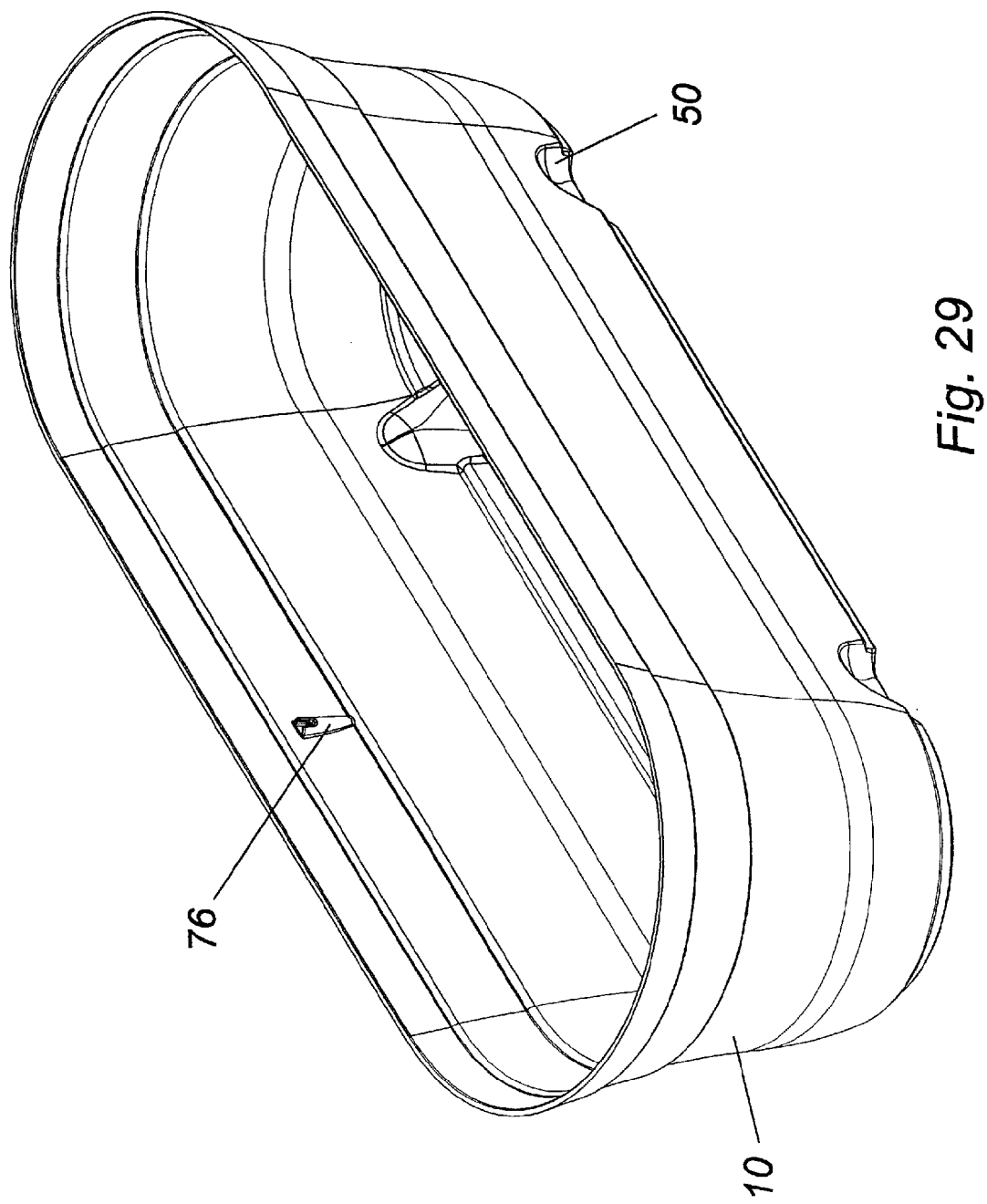
FIG. 29 is a top perspective view of the windowsill growth medium container.
Figure 30:
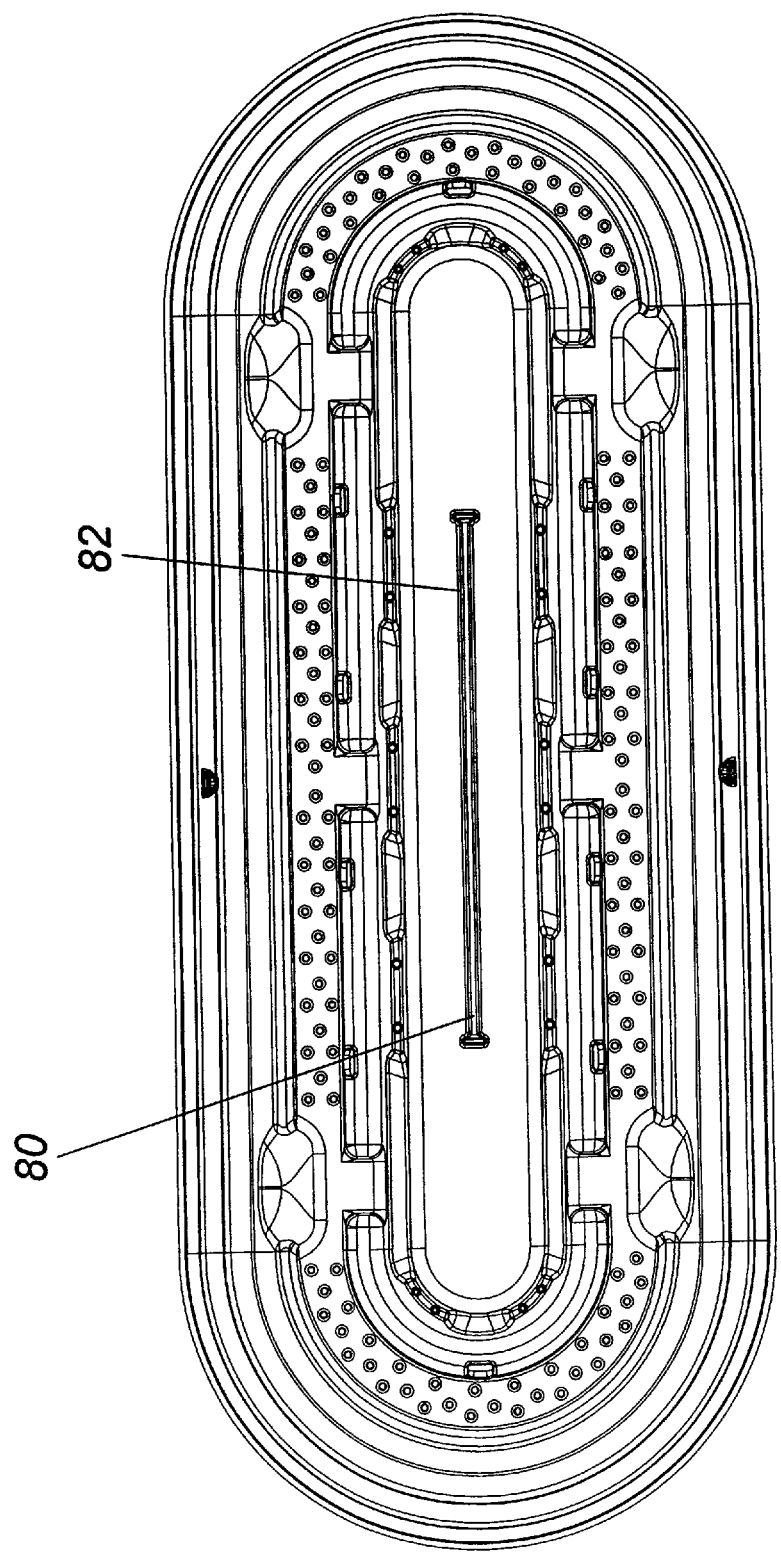
FIG. 30 is a top view of the windowsill growth medium container of FIG. 29, illustrating the storage position of the tie rod member.
Figure 31:
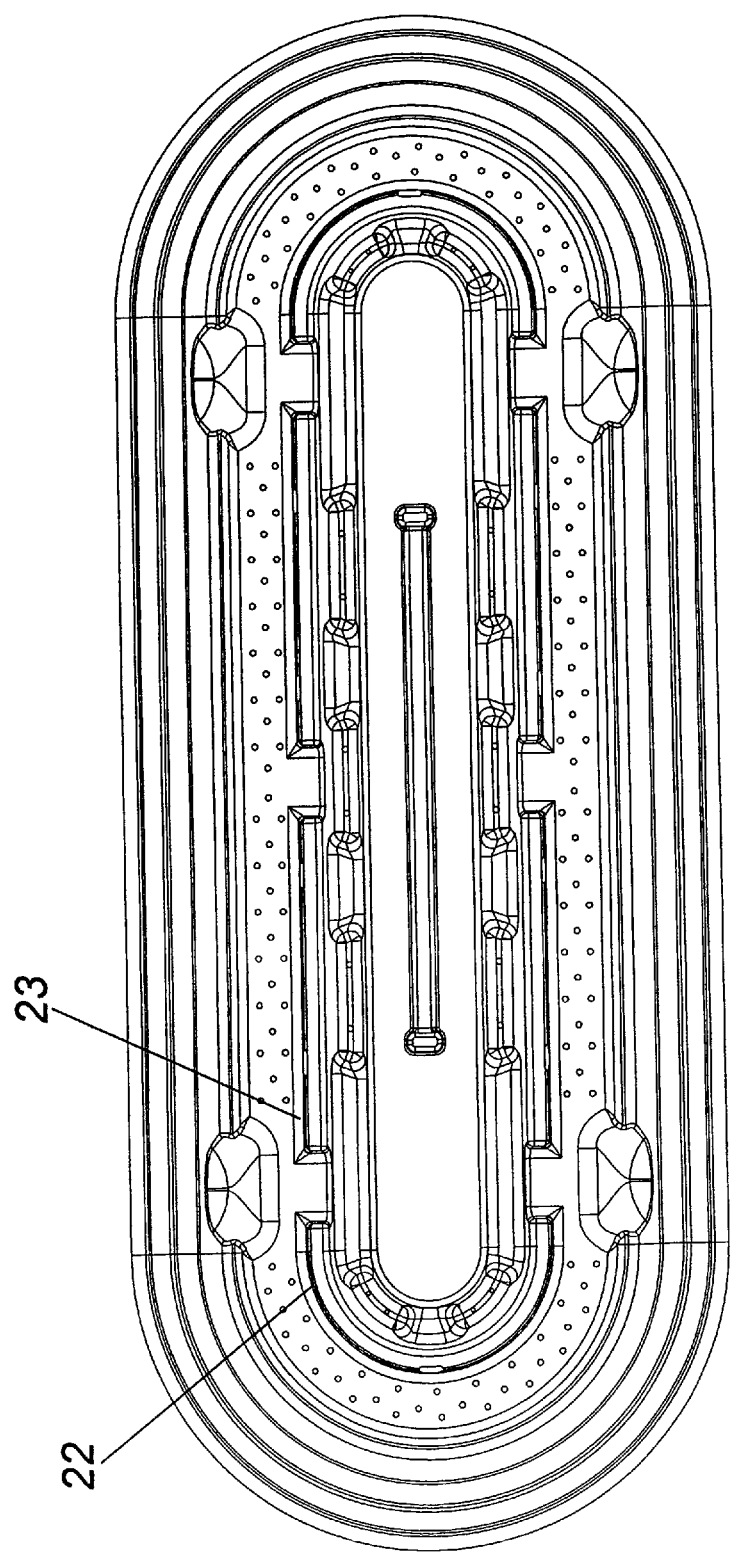
FIG. 31 is a bottom view of the windowsill growth medium container of FIG. 29.
Figure 32:
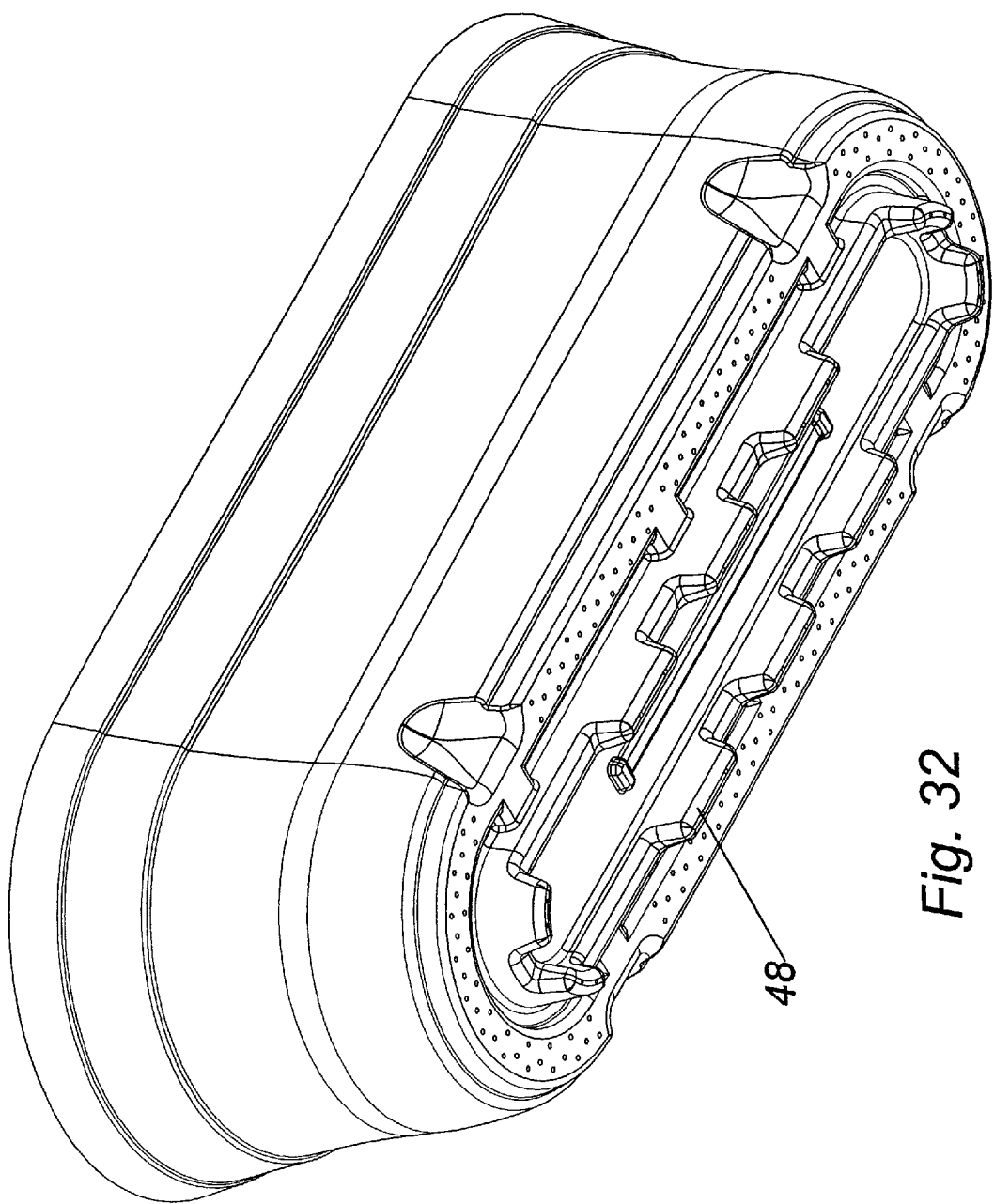
FIG. 32 is a bottom perspective view of the windowsill growth medium container of FIG. 29.
Figure 33:
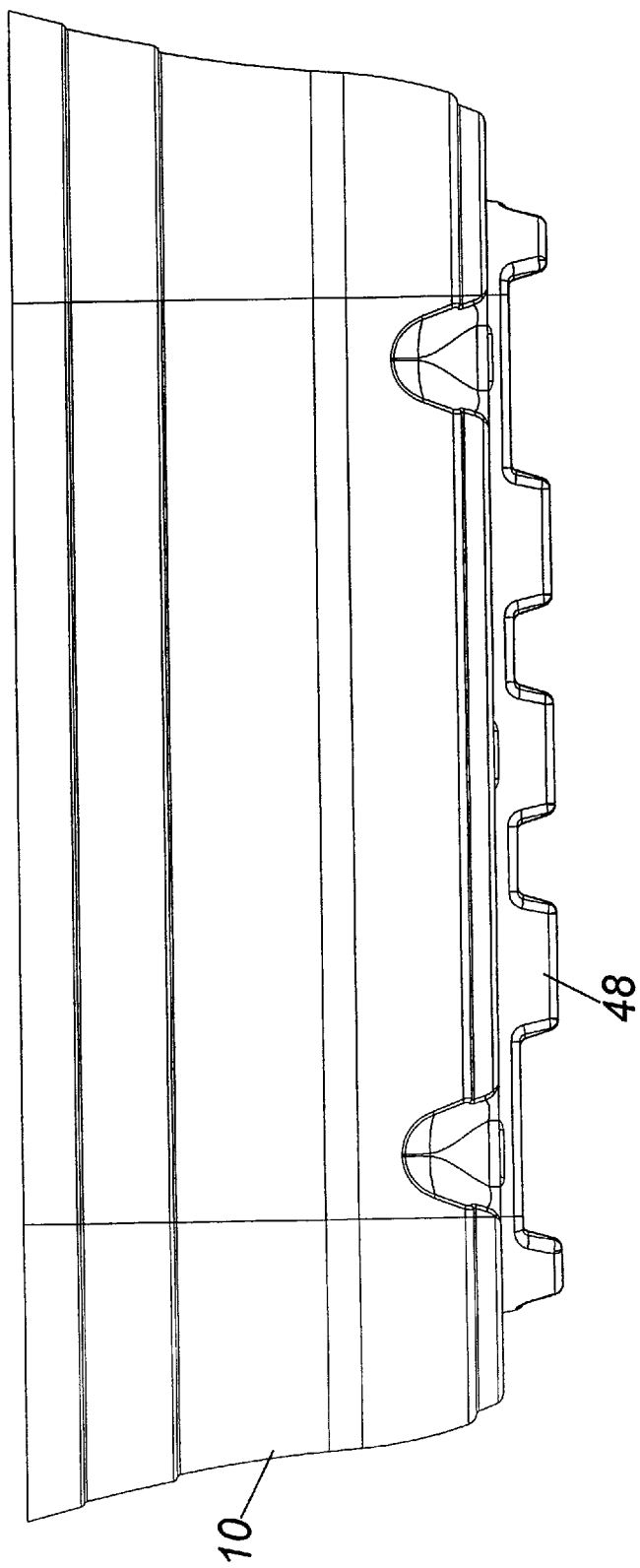
FIG. 33 is a side view of the windowsill growth medium container of FIG. 29.
Figure 34:
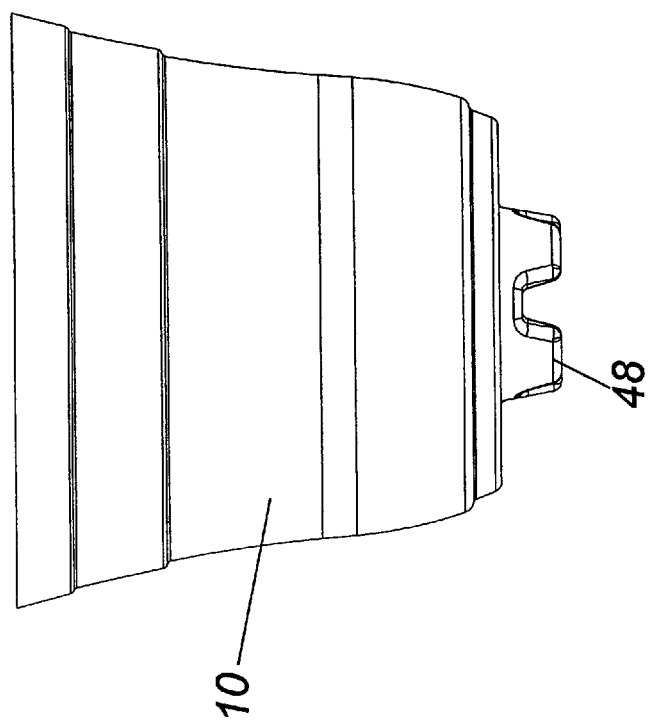
FIG. 34 is an end view of the windowsill growth medium container of FIG. 29.
Figure 35:
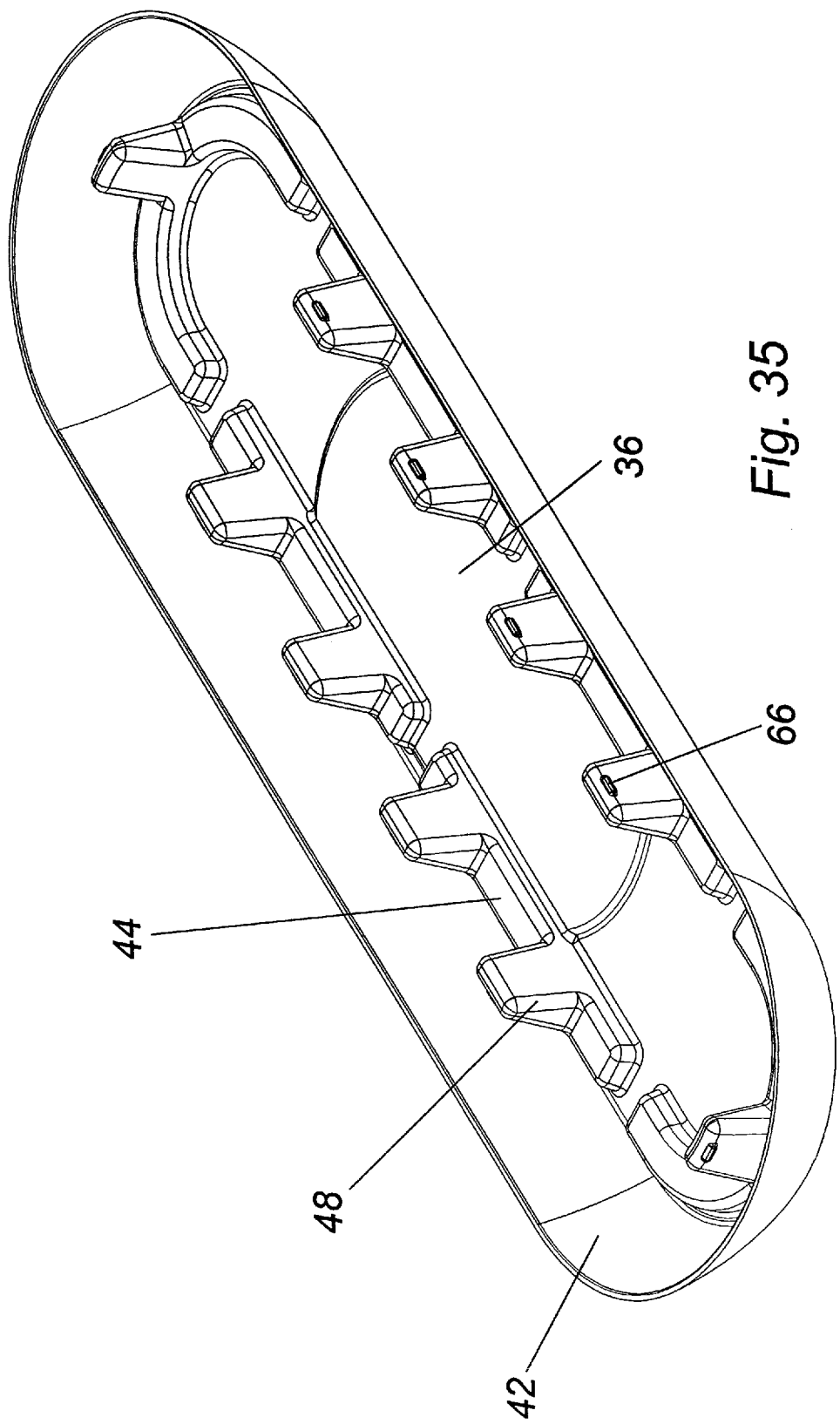
FIG. 35 is a top perspective view of a liquid container suitable for use with the windowsill self-watering planter.
Figure 36:
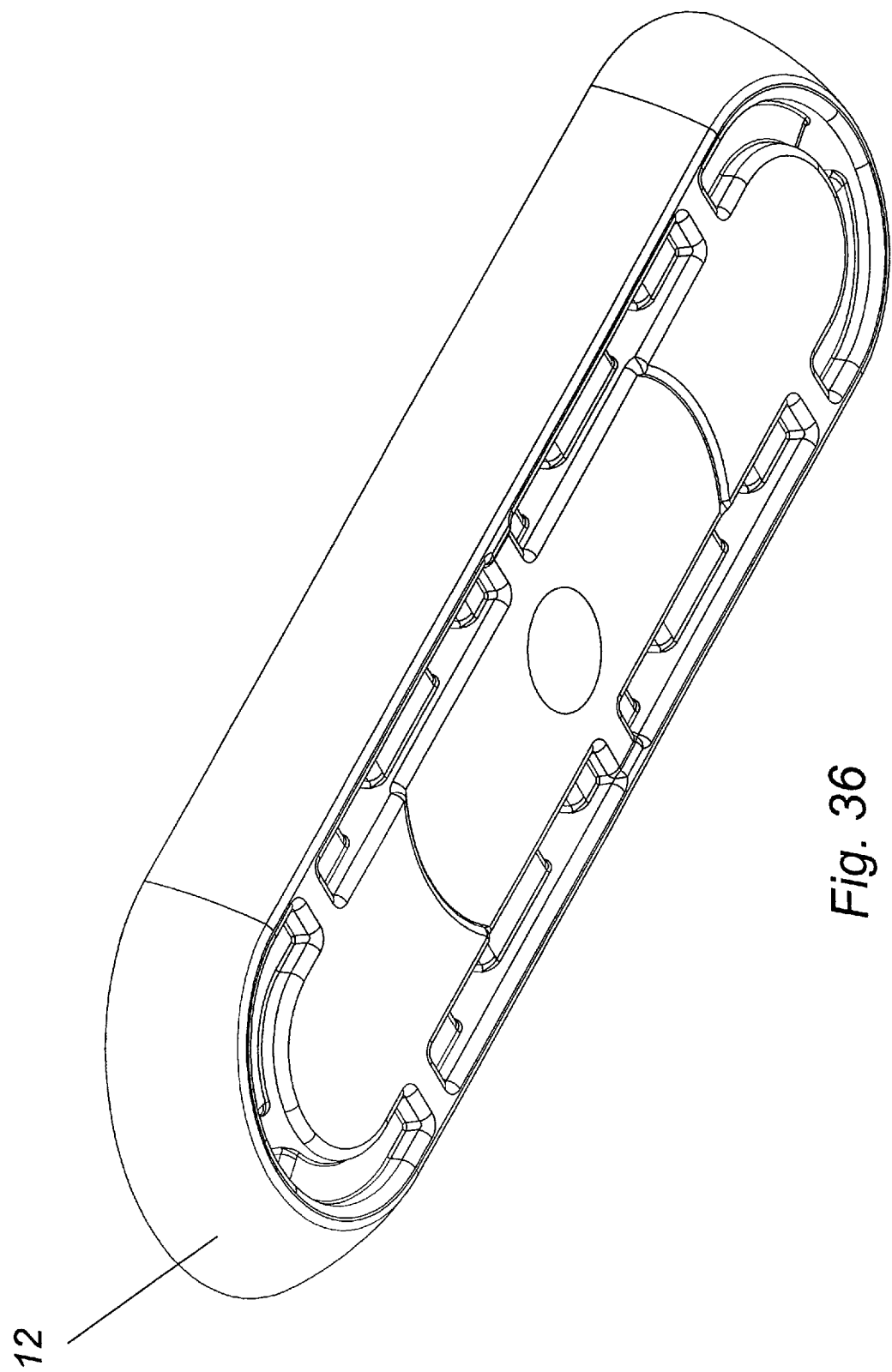
FIG. 36 is a bottom perspective view of the liquid container of FIG. 35.
Figure 37:
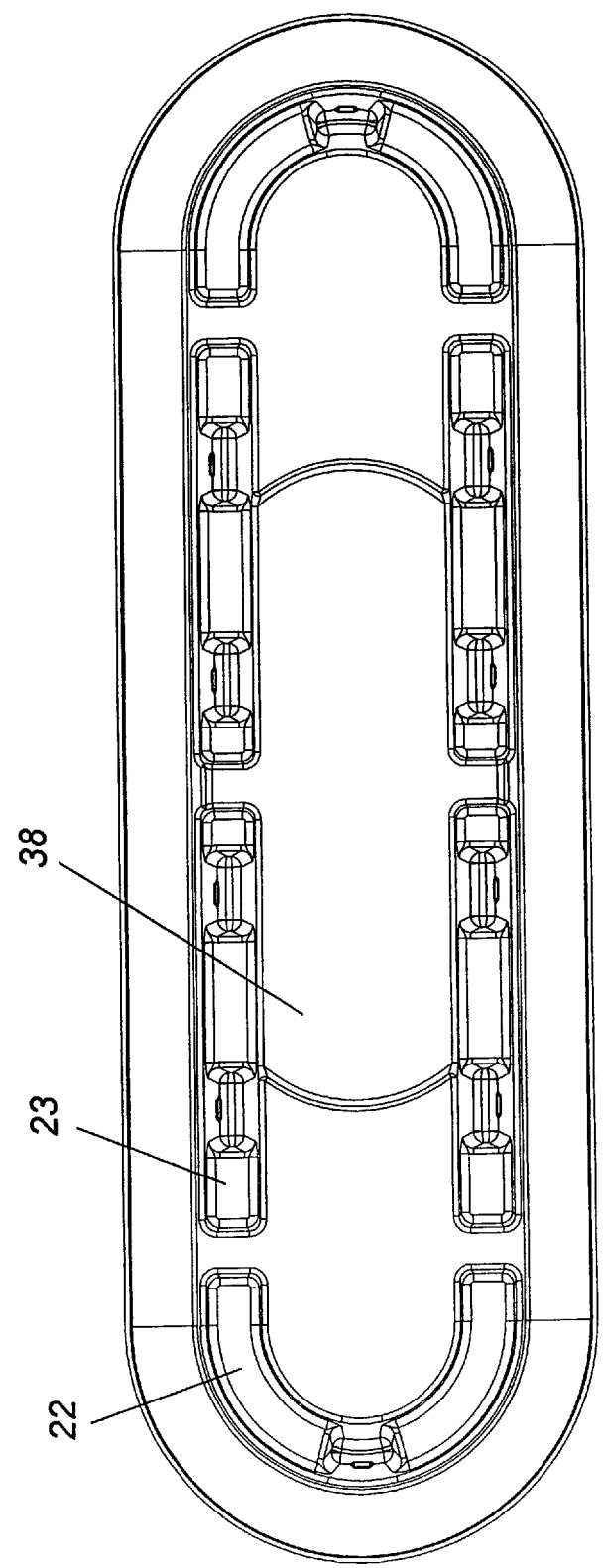
FIG. 37 is a top view of the liquid container of FIG. 35.
Figure 38:
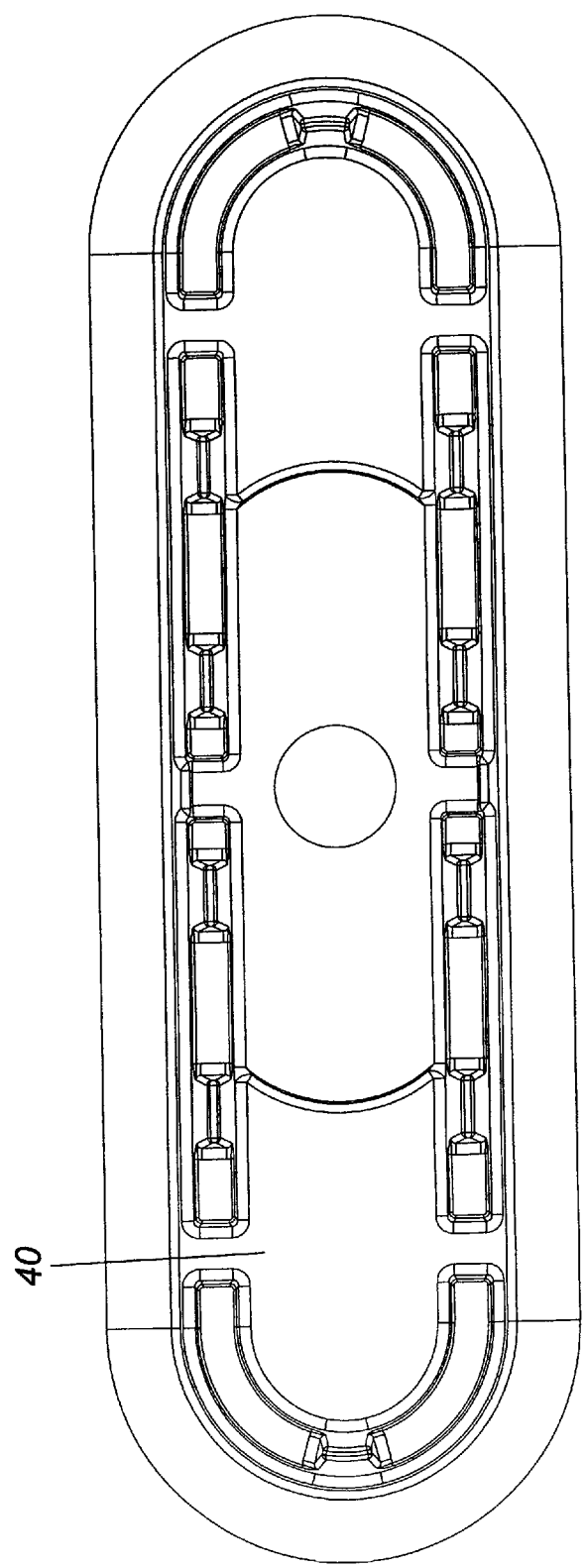
FIG. 38 is a bottom view of the liquid container of FIG. 35.
Figure 39:
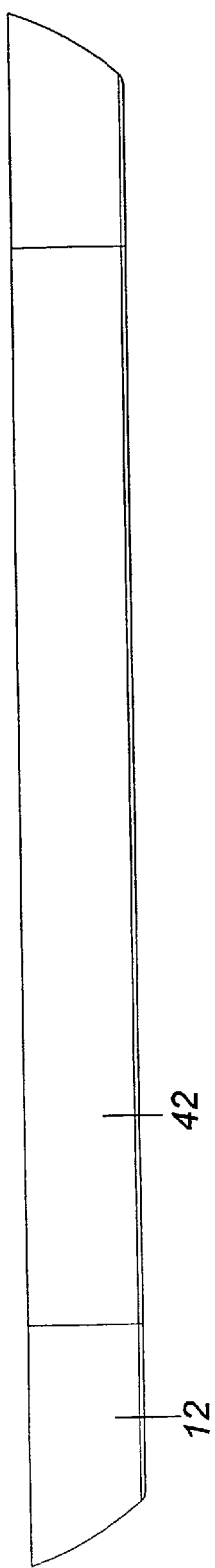
FIG. 39 is a side view of the liquid container of FIG. 35.
Figure 40:
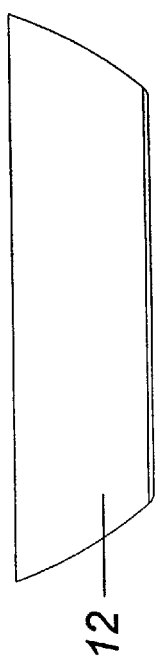
FIG. 40 is an end view of the liquid container of FIG. 35.
Figure 41:
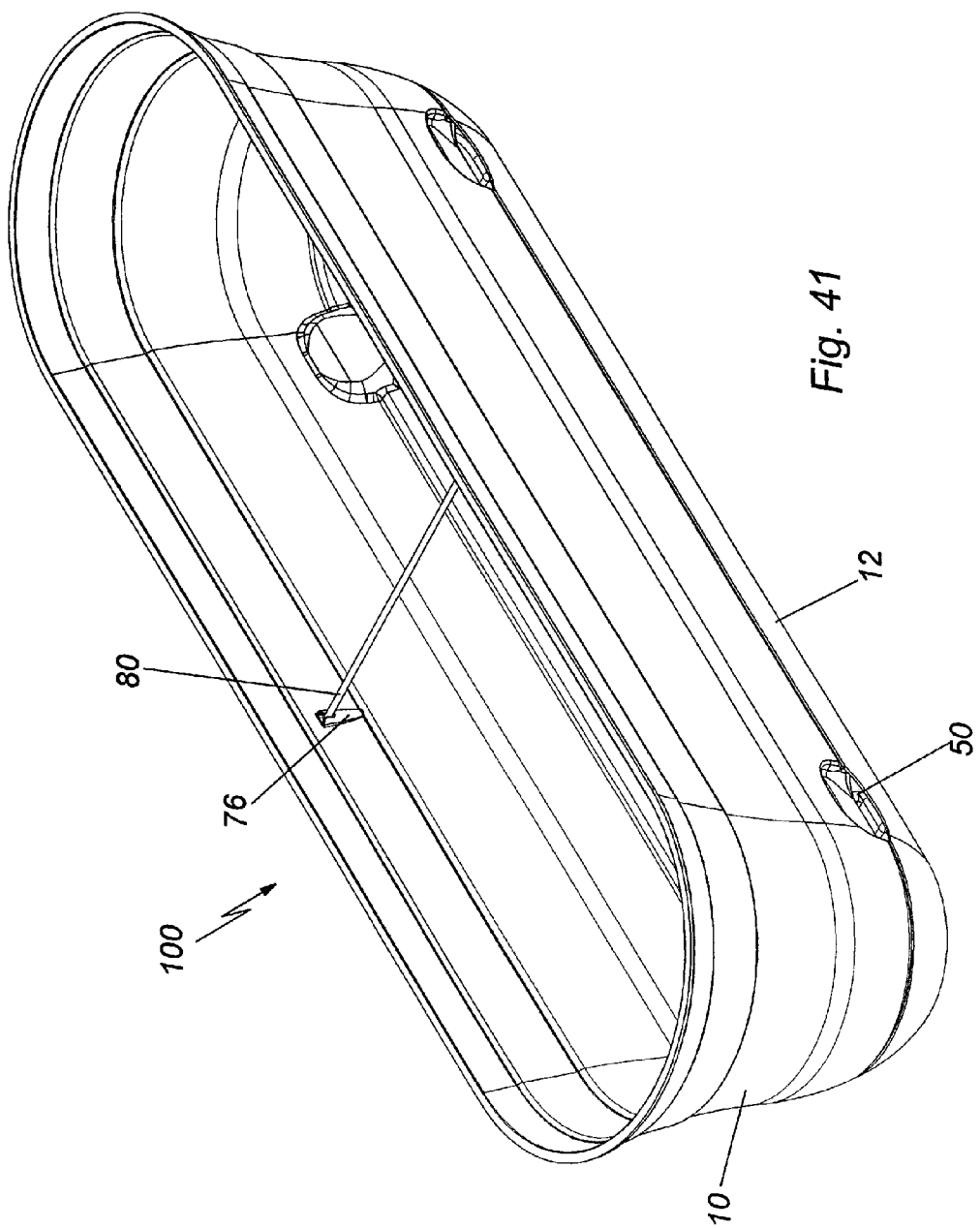
FIG. 41 is a top left perspective view of one embodiment of the self-watering planter, illustrating a window sill model.
Figure 42:
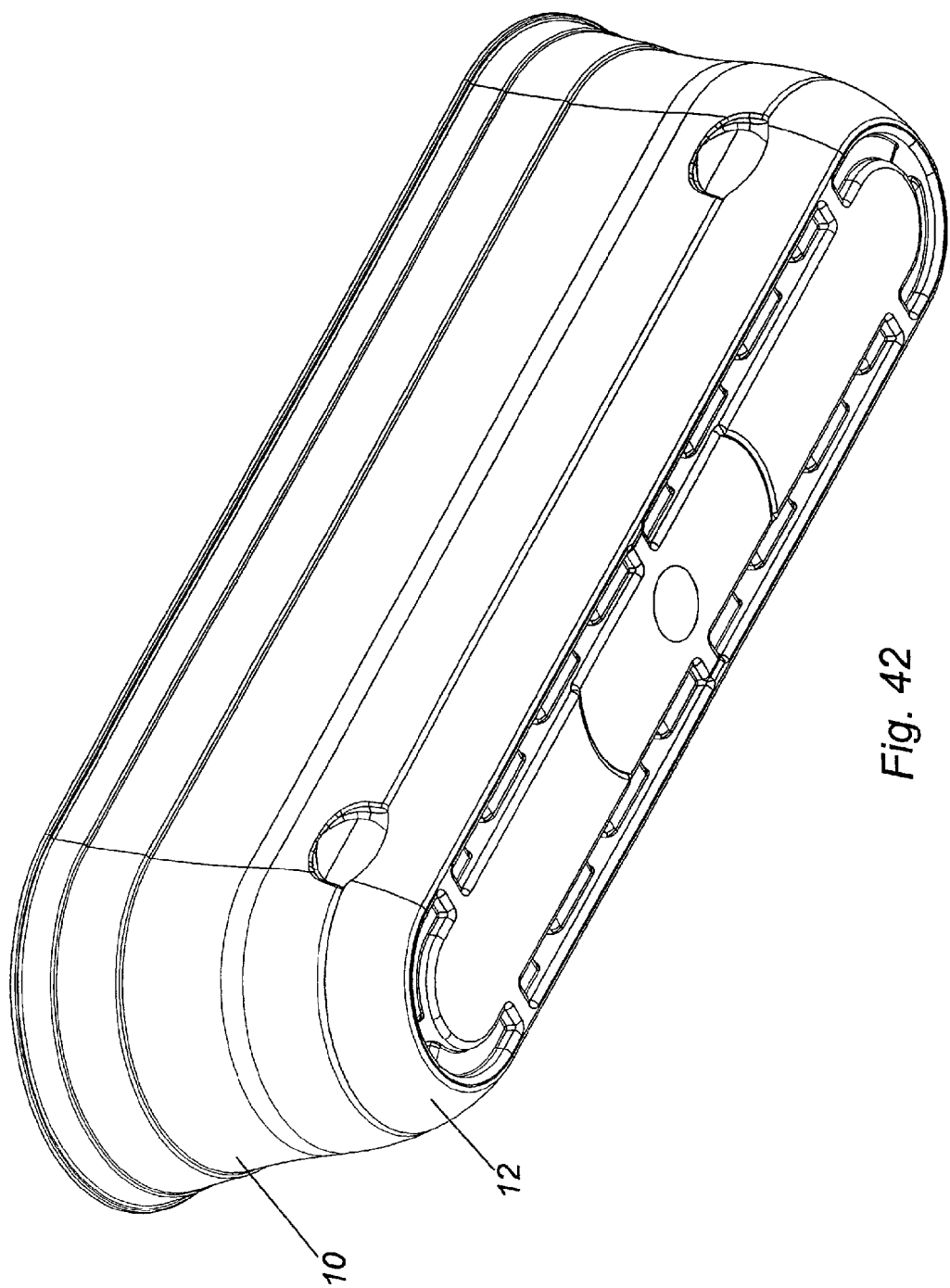
FIG. 42 is a bottom perspective view of the embodiment illustrated in FIG. 41.
Figure 43:
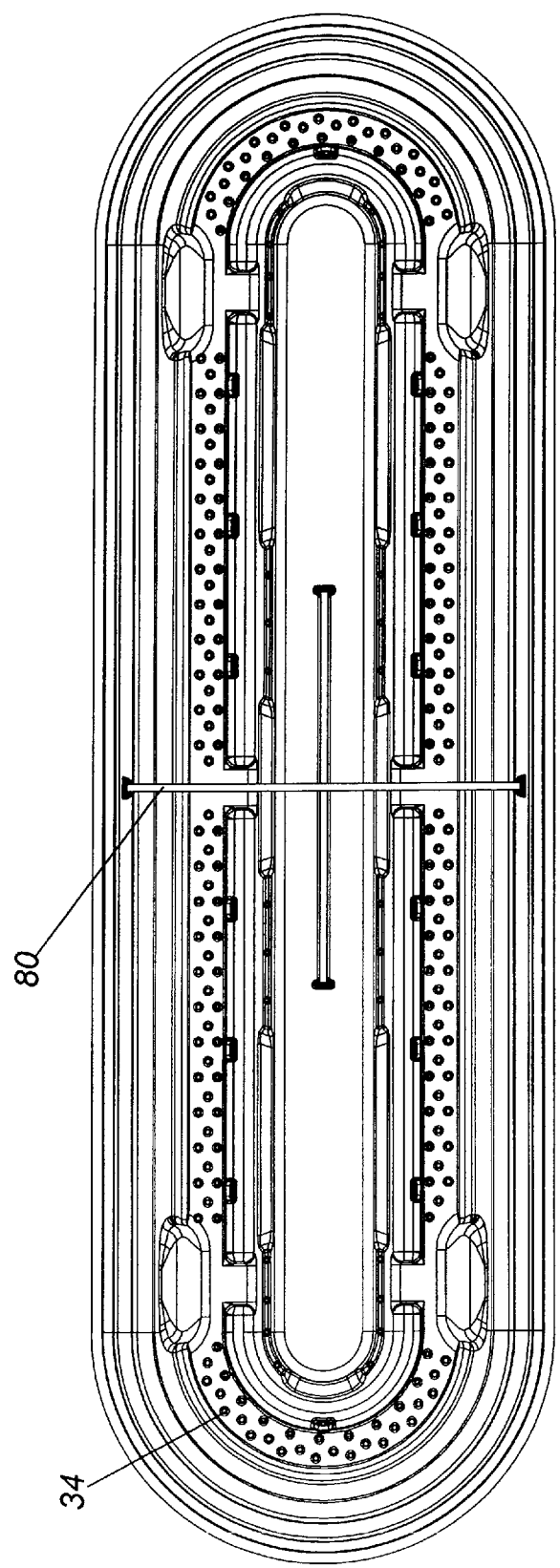
FIG. 43 is a top view of the embodiment illustrated in FIG. 41.
Figure 44:
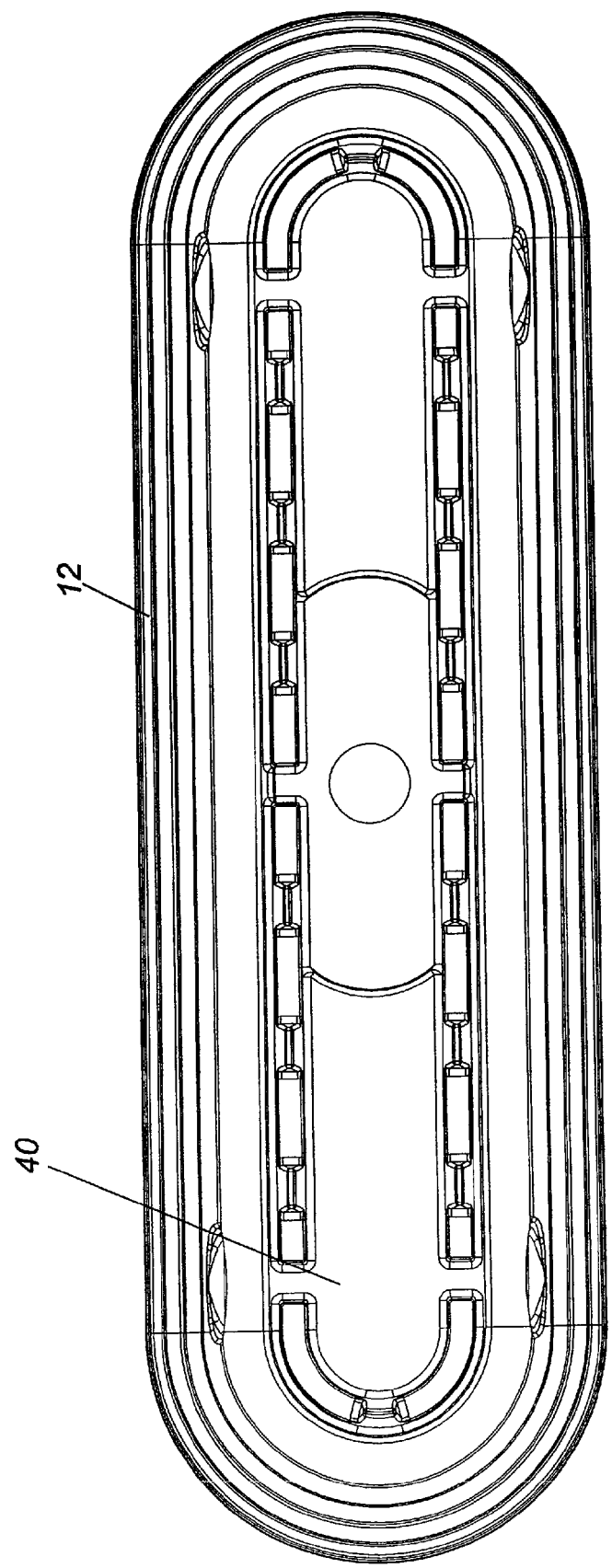
FIG. 44 is a bottom view of the embodiment illustrated in FIG. 41.
Figure 45:
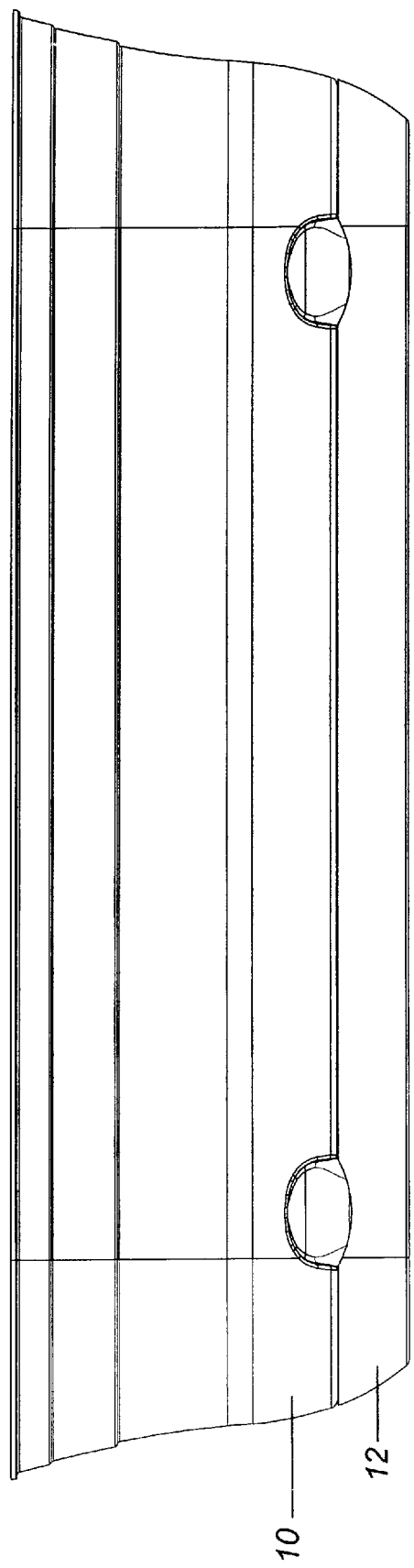
FIG. 45 is a front view of the embodiment illustrated in FIG. 41.
Figure 46:
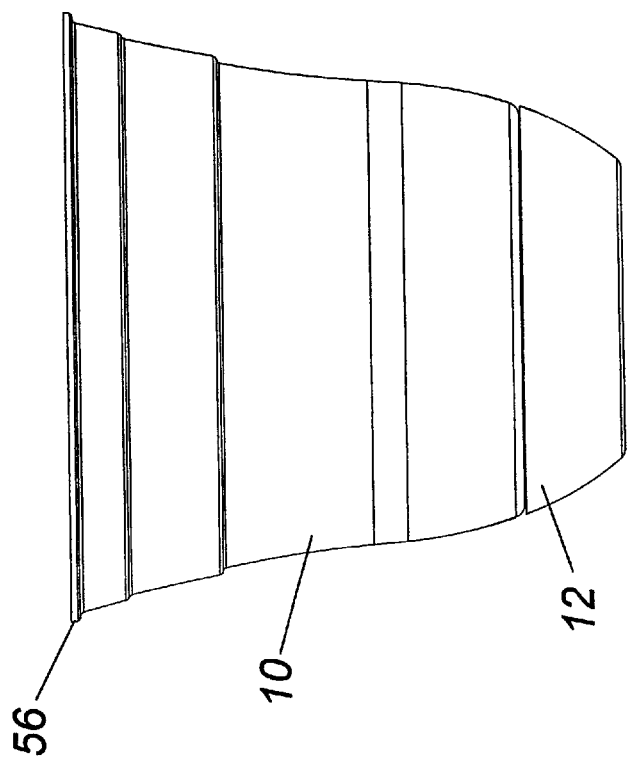
FIG. 46 is a side view of the embodiment illustrated in FIG. 41.

Referring to FIGS. 17, 18 and 20, the securing system for attaching the growth medium container 10 to the liquid container 12 is illustrated. The securing system includes a ramp portion 66 and a window portion 68. The ramp portion 66 is constructed and arranged to displace a portion of a panel 70 adjacent the window 68 sufficiently to allow the ramp portion 66 to fit into the window 68. The ramp portion 66 includes a back-stop surface 72 that is constructed and arranged to cooperate with a side surface 74 of the window 68 to prevent disengagement of the securing system. The ramp portion 66 and the window 68 are positioned above the upper surface 16 of the base panel 14 when the liquid container 12 is secured to the growth medium container 10. As illustrated, the ramp portion 66 is integrally formed onto the annular shaped post 44, and the window 68 is integrally formed into the tunnel portion 22 of the growth medium container 10. However, it should be noted that the location of these components may be reversed without departing from the scope of the invention.

Referring to FIGS. 21-46, an elongated window sill type embodiment of the present self-watering planter system 100 invention is illustrated. This embodiment is constructed using the elements as described above with additional features. The elongated embodiment additionally includes a pair of cross strut mounts 76 secured to an inner surface 78 of said sidewall 20. The cross strut mounts 76 are constructed and arranged to cooperate with a cross strut 80 for retention thereof. The cross strut 80 extends across a top portion of the sidewall with each distal end of the cross strut 80 secured to a respective cross strut mount 76 for providing support to the sidewall to prevent splaying and the like under load. In the preferred elongated embodiment, the base panel 14 includes a cross strut storage cavity 82 for storing and shipping said cross strut member.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objects and obtain the ends and advantages mentioned, as well as those inherent therein. Any compounds, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A self-watering planter system comprising:
   a growth medium container, said growth medium container including a base panel, said base panel including a top surface and a bottom surface, at least one sidewall integrally formed to said base panel at a generally obtuse angle for containing a growth medium for plants, said base panel including a tunnel portion extending upwardly from said top surface of said base panel, said tunnel portion including a first portion of a securing assembly for securing said growth medium container to a liquid container, said base panel including an annular well portion, said annular well portion extending downwardly with respect to said bottom surface of said base panel, a bottom portion of said annular well including at least one aperture for transfer of liquid to and from said reservoir container,
   a liquid container, said liquid container including a bottom panel having an upper surface and a lower surface, a continuous sidewall integrally formed to said bottom panel to create a watertight container having an open top, said bottom panel including an annular shaped post extending upwardly with respect to said upper surface, said post including a second portion of said securing assembly for securing said growth medium container to said liquid container, wherein said security assembly includes a ramp portion and a window portion, said ramp portion constructed and arranged to displace a portion of a panel adjacent said window portion sufficiently to allow said ramp portion to fit into said window portion, and wherein said ramp portion includes a back-stop surface, said back-stop surface constructed and arranged to cooperate with a side surface of said window portion to prevent disengagement of said securing system.

2. The self-watering planter system of claim 1 wherein said annular well extends downwardly from said bottom surface of said base panel to a position proximate said upper surface of said bottom panel.

3. The self-watering planter system of claim 1 wherein said ramp portion and said window portion are positioned above said top surface of said base panel when said liquid container is secured to said growth medium container.

4. The self-watering planter system of claim 3 wherein said ramp portion is integrally formed onto said annular shaped post and said window portion is integrally formed into said tunnel portion of said growth medium container.

5. The self-watering planter system of claim 2 wherein said well is serrated to create a plurality of square bottomed well serrations.

6. The self-watering planter system of claim 5 wherein said liquid container includes at least one key member, said key member positioned to cooperate with said square bottomed serrations to index the attachment of said liquid container to said growth medium container.

7. The self-watering planter system of claim 1 wherein said tunnel portion and said annular shaped post are segmented so that a portion of the tunnel and annular shaped post intermesh to index the attachment of the liquid container to the growth medium container.

8. The self-watering planter system of claim 1 wherein said growth medium container includes a funnel indention, said funnel indention positioned at a junction of said base panel and said sidewall for allowing liquid to be poured into said liquid container.

9. The self-watering planter system of claim 1 wherein said liquid container includes a spillway positioned in said liquid container sidewall, said spillway having an upper surface that is below the top surface of the sidewall, whereby excess liquid is allowed to escape over the spillway to prevent oversaturation of the growth medium.

10. The self-watering planter system of claim 1 wherein said base panel includes a plurality of apertures for through growth of plant roots, whereby said plant roots engage liquid within said liquid container.

11. The self-watering planter system of claim 1 wherein said growth medium container includes a depending lip extending around the perimeter of the top portion thereof for providing strength to said growth medium container.

12. The self-watering planter system of claim 11 wherein said depending lip includes a plurality of apertures therethrough for the attachment of a hanging support assembly for hanging said self-watering planter from an overhead support member.

13. The self-watering planter system of claim 12 wherein said apertures include a snap-lock feature, whereby a portion of said hanging support assembly is constructed and arranged to snap into said snap-lock feature for retention thereof.

14. The self-watering planter system of claim 12 wherein said base panel includes at least one aperture for the retention of said hanging support assembly during storage and shipment of said self-watering planter.

15. The self-watering planter system of claim 1 wherein an inner surface of said sidewall includes a pair of cross strut mounts secured thereon, said cross strut mounts constructed and arranged to cooperate with a cross strut for retention thereof, said cross strut extending across a top portion of said sidewall, each distal end of said cross strut secured to a respective cross strut mount for providing support to said sidewall.

16. The self-watering planter system of claim 15 wherein said base panel includes a cross strut storage cavity for storing and shipping said cross strut member.

\* \* \* \* \*